(12) United States Patent
Shimizu et al.

(10) Patent No.: US 10,245,950 B2
(45) Date of Patent: Apr. 2, 2019

(54) CONTROL DEVICE OF VEHICULAR FOUR-WHEEL DRIVE SYSTEM

(71) Applicant: TOYOTA JIDOSHA KABUSHIKI KAISHA, Toyota-shi, Aichi-ken (JP)

(72) Inventors: Daichi Shimizu, Okazaki (JP); Shunro Fukada, Toyota (JP); Satoshi Shimizu, Seto (JP); Masayuki Arai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 7 days.

(21) Appl. No.: 15/725,417

(22) Filed: Oct. 5, 2017

(65) Prior Publication Data

US 2018/0134154 A1  May 17, 2018

(30) Foreign Application Priority Data

Nov. 15, 2016 (JP) ................. 2016-222792

(51) Int. Cl.
| | | |
|---|---|---|
| B60K 23/08 | (2006.01) | |
| B60K 17/344 | (2006.01) | |
| F16D 11/14 | (2006.01) | |
| F16D 21/08 | (2006.01) | |
| F16D 23/02 | (2006.01) | |
| F16D 48/06 | (2006.01) | |
| B60K 17/35 | (2006.01) | |
| B60W 10/119 | (2012.01) | |
| B60W 10/16 | (2012.01) | |
| B60K 23/04 | (2006.01) | |

(52) U.S. Cl.
CPC ........ *B60K 23/0808* (2013.01); *B60K 17/344* (2013.01); *B60K 17/35* (2013.01); *B60K 23/08* (2013.01); *B60W 10/119* (2013.01); *B60W 10/16* (2013.01); *F16D 11/14* (2013.01); *F16D 21/08* (2013.01); *F16D 23/02* (2013.01); *F16D 48/06* (2013.01); *B60K 2023/043* (2013.01); *B60K 2023/085* (2013.01); *B60W 2720/14* (2013.01); *F16D 2500/10431* (2013.01); *F16D 2500/10456* (2013.01); *F16D 2500/30421* (2013.01); *F16D 2500/3165* (2013.01)

(58) Field of Classification Search
None
See application file for complete search history.

(56) References Cited

U.S. PATENT DOCUMENTS 9,623,748 B2 * 4/2017 Strasser ................. B60K 23/08
9,849,777 B2 * 12/2017 Yoshimura ........... B60K 17/344
(Continued)

FOREIGN PATENT DOCUMENTS

| JP | 2016-074370 A | 5/2016 |
| KR | 2003-0036940 A | 5/2003 |

(Continued)

*Primary Examiner* — Dirk Wright
(74) *Attorney, Agent, or Firm* — Oliff PLC

(57) ABSTRACT

When a vehicle is switched from a two-wheel-drive mode to a four-wheel-drive mode during turning, rotation of a Rr dog clutch is synchronized by a synchro mechanism. Rotation of a Fr dog clutch is synchronized, by controlling coupling torque of a control coupling that transmits power to a rear wheel that provides an outer wheel during turning. Thus, rotation of the Fr dog clutch is also synchronized, so that shock at the time of engagement of the Fr dog clutch can be suppressed.

5 Claims, 12 Drawing Sheets

(56) References Cited

U.S. PATENT DOCUMENTS

| | | | |
|---|---|---|---|
| 9,925,871 B2* | 3/2018 | Tamura | B60K 23/0808 |
| 2004/0077457 A1 | 4/2004 | Serebrennikov et al. | |
| 2005/0121248 A1 | 6/2005 | Ushiroda et al. | |
| 2015/0096814 A1 | 4/2015 | Maeda | |
| 2015/0111696 A1 | 4/2015 | Maeda et al. | |
| 2016/0059696 A1* | 3/2016 | Quehenberger | B60K 23/08 |
| | | | 701/56 |
| 2016/0101689 A1 | 4/2016 | Yoshimura et al. | |

FOREIGN PATENT DOCUMENTS

| | | |
|---|---|---|
| KR | 2005-0054440 A | 6/2005 |
| KR | 2011-0117094 A | 10/2011 |
| WO | 2010/085519 A1 | 7/2010 |
| WO | 2015/075541 A1 | 5/2015 |

* cited by examiner

DISENGAGED

ROTATION SYNCHRONIZED

ENGAGED (CONNECTED)

CONTROL DEVICE OF VEHICULAR FOUR-WHEEL DRIVE SYSTEM

INCORPORATION BY REFERENCE

The disclosure of Japanese Patent Application No. 2016-222792 filed on Nov. 15, 2016 including the specification, drawings and abstract is incorporated herein by reference in its entirety.

BACKGROUND

1. Technical Field

The disclosure relates to a control device of a vehicular four-wheel drive system, and in particular to control of switching from a two-wheel-drive mode to a four-wheel-drive mode.

2. Description of Related Art

A vehicular four-wheel drive system is proposed which includes a transfer case that distributes a part of drive power delivered from a drive source to left and right secondary drive wheels, a propeller shaft that transmits the power delivered from the transfer case to a differential mechanism to which the left and right secondary drive wheels are coupled, a first meshing clutch that is provided in the transfer case, and selectively permits and inhibits power transmission between the drive source and the propeller shaft, and a second meshing clutch that selectively permits and inhibits power transmission between the propeller shaft and the differential mechanism. The differential mechanism has a pair of control couplings for adjusting transmission torque transmitted to the left and right secondary drive wheels, and the second meshing clutch has a synchro mechanism. One example of this type of four-wheel drive system is illustrated in FIG. 10 of Japanese Patent Application Publication No. 2016-74370 (JP 2016-74370 A). In the vehicular four-wheel drive system described in JP 2016-74370A, the first meshing clutch and the second meshing clutch are disengaged during two-wheel driving, so as to eliminate dragging of the propeller shaft, etc. and improve the fuel efficiency.

SUMMARY

In the vehicular four-wheel drive system including the first meshing clutch and the second meshing clutch, like the one described in JP 2016-74370A, if a difference in the rotational speed arises in the meshing clutch of which rotation is not synchronized by the synchro mechanism, when the drive system is switched from a two-wheel drive state in which the first meshing clutch and the second meshing clutch are released, to a four-wheel drive state in which the first meshing clutch and the second meshing clutch are engaged, shock occurs when the above-indicated meshing clutch is engaged. For example, during turning of the vehicle, the rotational speed differs among the respective wheels, since these wheels have different tracks; therefore, a difference in the rotational speed arises in the meshing clutch that is not provided with the synchro mechanism, and shock occurs at the time of engagement of the clutch.

This disclosure provides a control device that can suppress or reduce shock when the vehicle is switched from a two-wheel-drive mode to a four-wheel-drive mode during turning, in a vehicular four-wheel drive system including a first meshing clutch and a second meshing clutch.

According to one aspect of the disclosure, a control device for a four-wheel drive system of a vehicle including a transfer case configured to distribute a part of drive power generated from a drive source to left and right secondary drive wheels, a differential mechanism coupled to the left and right secondary drive wheels, a propeller shaft that transmits power delivered from the transfer case, to the differential mechanism, a first meshing clutch provided in the transfer case and configured to selectively permit and inhibit power transmission between the drive source and the propeller shaft, and a second meshing clutch configured to selectively permit and inhibit power transmission between the propeller shaft and the differential mechanism is provided. The differential mechanism includes a pair of control couplings configured to adjust transmission torque transmitted to the left and right secondary drive wheels, and one of the first meshing clutch and the second meshing clutch includes a synchro mechanism. The control device includes an electronic control unit configured to synchronize rotation of the above-indicated one of the first meshing clutch and the second meshing clutch including the synchro mechanism, by means of the synchro mechanism, and synchronize rotation of the other of the first meshing clutch and the second meshing clutch, by controlling coupling torque of one of the pair of control couplings which transmits power to one of the secondary drive wheels which provides an outer wheel during turning.

In the control device according to a first form of the above aspect of the disclosure, the synchro mechanism may be configured to synchronize rotation of the second meshing clutch, and the electronic control unit may be configured to control the coupling torque of the above-indicated one of the control couplings after the second meshing clutch is engaged, so as to synchronize rotation of the first meshing clutch.

In the control device according to a second form of the above aspect of the disclosure, the synchro mechanism may be configured to synchronize rotation of the first meshing clutch, and the electronic control unit may be configured to control the coupling torque of the above-indicated one of the control couplings after the first meshing clutch is engaged, so as to synchronize rotation of the second meshing clutch.

In the control device according to a third form of the above aspect of the disclosure, the electronic control unit may be configured to engage the other meshing clutch, after rotation of the other meshing clutch is synchronized.

In the control device according to a fourth form of the above aspect of the disclosure, the electronic control unit may be configured to calculate the coupling torque, by multiplying a moment of inertia of a rotating body whose rotational speed is raised by said one of the control couplings, by an angular acceleration calculated from a target rotational speed of the rotating body at which rotation of the other meshing clutch is synchronized, and a preset target engagement time of the control coupling.

With the control device of the vehicular four-wheel drive system according to the above aspect of the disclosure, when the vehicle is switched from the two-wheel-drive mode to the four-wheel-drive mode during turning, rotation of one of the meshing clutches is synchronized by the synchro mechanism. Also, rotation of the other meshing clutch is synchronized, through control of the coupling torque of one of the control couplings which transmits power to the secondary drive wheel that provides the outer wheel during turning. Since the rotational speed of the secondary drive wheel as the turning outer wheel is higher than the rotational speed of the secondary drive wheel as the turning inner wheel, the rotational speed of a rotating body whose rotational speed is raised by the above-indicated control coupling can be raised to the rotational speed at which the other meshing clutch rotates in synchronization. Thus, rotation of the other meshing clutch that is not synchronized by the synchro mechanism is also synchronized; therefore, shock can be suppressed or reduced at the time of engagement of the other meshing clutch, and shock can be suppressed or reduced, even in the case where the vehicle is switched from the two-wheel-drive mode to the four-wheel-drive mode during turning.

With the control device of the vehicular four-wheel drive system according to the first form of the disclosure, when the vehicle is switched from the two-wheel-drive mode to the four-wheel-drive mode during turning, the second meshing clutch of which rotation is synchronized by the synchro mechanism is initially engaged. Then, the coupling torque of one of the control couplings is controlled so that rotation of the first meshing clutch is synchronized; therefore, shock that would occur when the first meshing clutch is engaged can be suppressed or reduced.

With the control device of the vehicular four-wheel drive system according to the second form of the disclosure, when the vehicle is switched from the two-wheel-drive mode to the four-wheel-drive mode during turning, the first meshing clutch of which rotation is synchronized by the synchro mechanism is initially engaged. Then, the coupling torque of one of the control couplings is controlled so that rotation of the second meshing clutch is synchronized; therefore, shock that would occur when the second meshing clutch is engaged can be suppressed or reduced.

With the control device of the vehicular four-wheel drive system according to the third form of the disclosure, the other meshing clutch is engaged, after rotation of the other meshing clutch is synchronized; therefore, shock that would occur at the time of engagement of the other meshing clutch can be suppressed or reduced.

With the control device of the vehicular four-wheel drive system according to the fourth form of the disclosure, the coupling torque with which rotation of the other meshing clutch is synchronized after a lapse of a target engagement time can be calculated by multiplying the moment of inertia of the rotating body whose rotational speed is raised by one of the control couplings, by the angular acceleration calculated from the target rotational speed of the rotating body and the target engagement time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
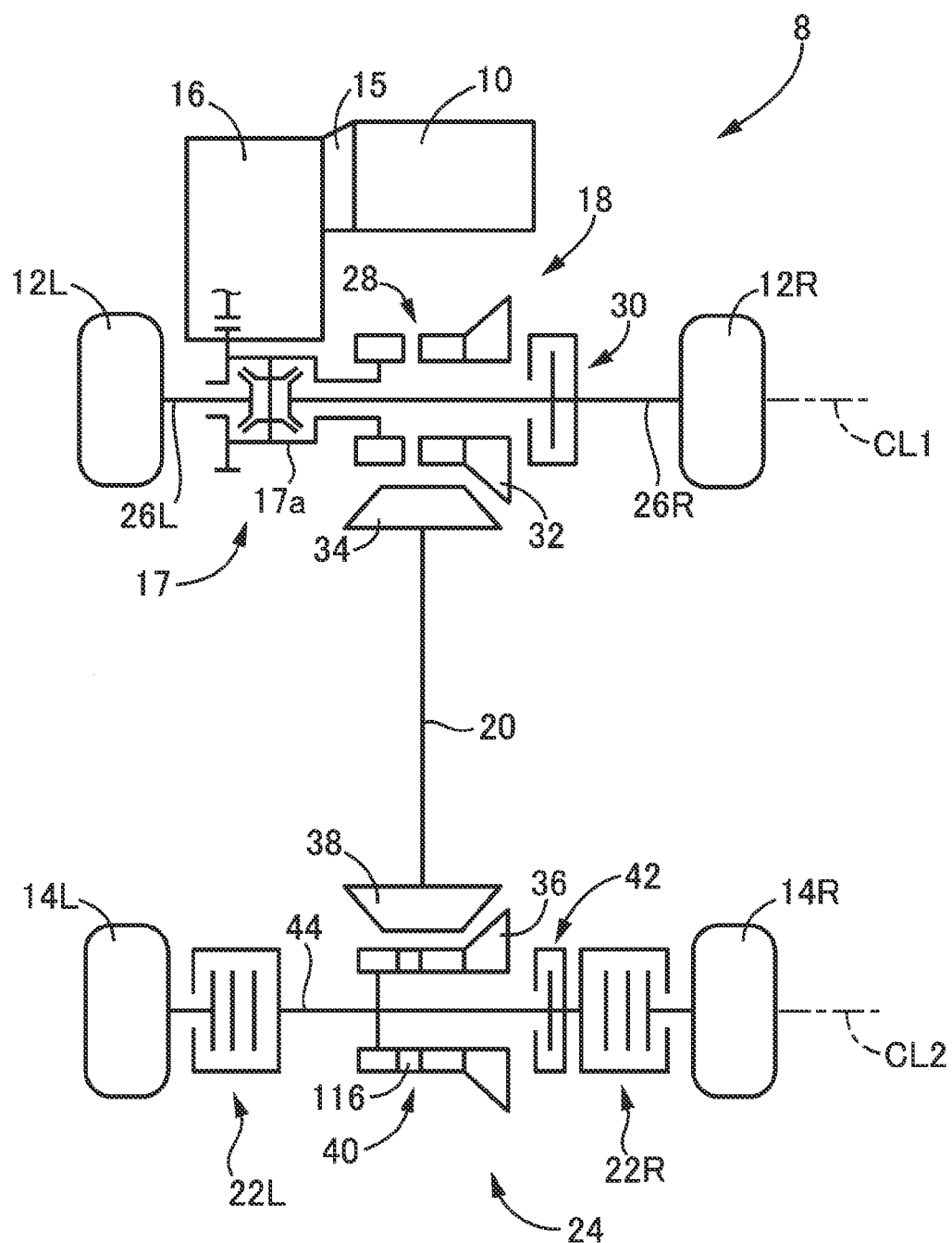
FIG. 1 is a skeleton diagram schematically showing the configuration of a vehicular four-wheel drive system as one embodiment of the disclosure.

Some embodiments of the disclosure will be described in detail with reference to the drawings. In the following embodiments, parts or components illustrated in the drawings are simplified or modified as needed, and the ratio of dimensions, shape, etc. of each part or component are not necessarily depicted with accuracy.

FIG. 1 is a skeleton diagram schematically showing the configuration of a vehicular four-wheel drive system 8 (which will be called "four-wheel drive system 8") as one embodiment of the disclosure. The four-wheel drive system 8 is an FF-vehicle-based, four-wheel drive system that uses an engine 10 as a drive source, and transmits drive power of the engine 10 to front wheels 12L, 12R (front wheels 12 when they are not distinguished from each other) as primary drive wheels, and rear wheels 14L, 14R (rear wheels 14 when they are not distinguished from each other) as secondary drive wheels. The four-wheel drive system 8 includes the engine 10, torque converter 15, automatic transmission 16, front differential mechanism 17 (which will be called "front differential 17"), transfer case 18, propeller shaft 20, and a rear differential mechanism 24 (which will be called "rear differential 24") including a pair of left and right control couplings 22L, 22R (control couplings 22 when they are not distinguished from each other). The drive power delivered from the engine 10 is transmitted to a pair of left and right front wheels 12L, 12R, via the torque converter 15, automatic transmission 16, front differential 17, and a pair of left and right front-wheel axles 26L, 26R. Also, a part of the drive power delivered from the engine 10 is transmitted to a pair of left and right rear wheels 14L, 14R, via the torque converter 15, automatic transmission 16, transfer case 18, propeller shaft 20, and the rear differential 24. The rear wheels 14 correspond to the secondary drive wheels of the disclosure, and the rear differential 24 corresponds to the differential mechanism of the disclosure.

The automatic transmission 16 is a well-known multi-speed transmission that is provided on a power transmission pathway between the engine 10 and the front differential 17, and includes two or more planetary gear trains and two or more friction devices (such as clutches and brakes), for example. Since the automatic transmission 16 is a part of the publicly known technology, the structure and operation of the automatic transmission 16 will not be described in detail.

The front differential 17 is in the form of a well-known bevel-gear-type differential mechanism, and is operable to transmit power to the front-wheel axles 26L, 26R (front-wheel axles 26 when they are not particularly distinguished from each other) coupled to the left and right front wheels 12, while providing a rotational speed difference to the front wheels 12 as needed. Since the front differential 17 is a part of the publicly known technology, the structure and operation of the front differential 17 will not be described in detail.

The transfer case 18 is provided at a position aligned with the front differential 17 in a direction of an axis CL1 of the front-wheel axles 26. The transfer case 18 distributes drive power delivered from the engine 10, to the front wheels 12 and the rear wheels 14 (namely, imparts a part of the drive power to the rear wheels 14), and includes a Fr dog clutch 28, and a Fr dog operation clutch 30 for operating the Fr dog clutch 28. The Fr dog clutch 28 selectively connects and disconnects a power transmission pathway between the transfer case 18 and the propeller shaft 20. The structure of the transfer case 18 will be described later. The Fr dog clutch 28 corresponds to the first meshing clutch of the disclosure.

The propeller shaft 20 is interposed between the transfer case 18 and the rear differential 24, and transmits power transmitted from a Fr ring gear 32 that functions as an output rotating member of the transfer case 18, to the rear differential 24. The propeller shaft 20 is provided with a driven pinion gear 34 that meshes with the Fr ring gear 32 of the transfer case 18, and a drive pinion gear 38 that meshes with a Rr ring gear 36 (which will be described later) of the rear differential 24.

The rear differential 24 includes a Rr dog clutch 40, Rr dog operation clutch 42 for operating the Rr dog clutch 40, left control coupling 22L provided between a rear-wheel axle 44 and the rear wheel 14L, and a right control coupling 22R provided between the rear-wheel axle 44 and the rear wheel 14R. The Rr dog clutch 40 selectively connects and disconnects a power transmission pathway between the propeller shaft 20 and the rear differential 24. During four-wheel driving, coupling torque Tcouple of each of the pair of left and right control couplings 22L, 22R is controlled, so that power transmitted to the rear differential 24 via the transfer case 18, propeller shaft 20, etc. is distributed as needed to the left and right rear wheels 14 and generated from the rear wheels 14. The structures of the Rr dog clutch 40 and the Rr dog operation clutch 42 will be described later. The left control coupling 22L and the right control coupling 22R correspond to the pair of control couplings of the disclosure, which adjust transmission torque transmitted to the left and right secondary drive wheels, and the Rr dog clutch 40 corresponds to the second meshing clutch of the disclosure.

The left control coupling 22L is provided between the rear-wheel axle 44 and the rear wheel 14L, and adjusts transmission torque between the rear-wheel axle 44 and the rear wheel 14L. The left control coupling 22L is an electronically controlled coupling in the form of a wet multiple disc clutch, and transmission torque transmitted to the rear wheel 14L is adjusted by adjusting the coupling torque (torque capacity) of the left control coupling 22L. The right control coupling 22R is provided between the rear-wheel axle 44 and the rear wheel 14R, and adjusts transmission torque between the rear-wheel axle 44 and the rear wheel 14R. The right control coupling 22R is an electronically controlled coupling in the form of a wet multiple disc clutch, and transmission torque transmitted to the rear wheel 14R is adjusted by adjusting the coupling torque (torque capacity) of the right control coupling 22R. Thus, the torque distribution of the left and right rear wheels 14 is adjusted, by adjusting the coupling torque Tcouple of each of the left and right control couplings 22L, 22R (which will be denoted as "control couplings 22" when they are not distinguished from each other). The control coupling 22 is a part of the publicly known technology, and therefore, the structure and operation of the control coupling 22 will not be described in detail.

Figure 2:
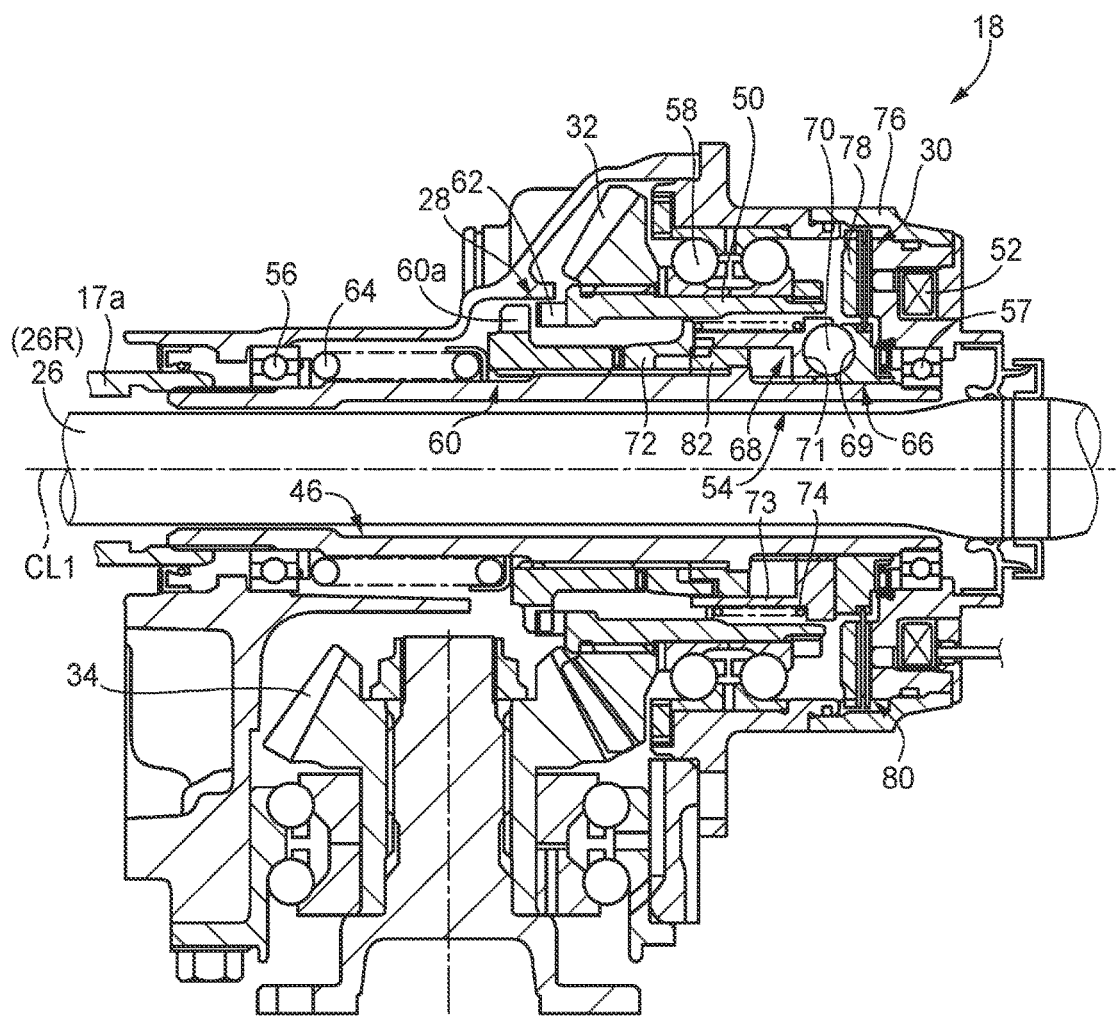
FIG. 2 is a cross-sectional view of a transfer case of FIG. 1.

FIG. 2 is a cross-sectional view of the transfer case 18. The transfer case 18 is provided on a power transmission pathway between the front differential 17 and the propeller shaft 20, and transmits a part of the driver power delivered from the engine 10 to the rear wheels 14, via the propeller shaft 20, rear differential 24, etc.

The transfer case 18 is disposed on the radially outer side of the front-wheel axle 26R. The transfer case 18 includes a cylindrical first rotating member 46, a cylindrical second rotating member 50 to which the Fr ring gear 32 that meshes with the driven pinion gear 34 is secured, and the Fr dog clutch 28 that connects and disconnects the first rotating member 46 to and from the second rotating member 50. The first rotating member 46 is spline-fitted to a differential case 17a of the front differential 17, and is rotatable about the axis CL1 of the front-wheel axle 26. Like the first rotating member 46, the second rotating member 50 is also rotatable about the axis CL1. The transfer case 18 further includes a first thrust amplification mechanism 54 that generates thrust force for switching the Fr dog clutch 28 between engaged and disengaged states, Fr dog operation clutch 30 for operating the Fr dog clutch 28 via the first thrust amplification mechanism 54, and a first electromagnetic solenoid 52 for adjusting the torque capacity of the Fr dog operation clutch 30.

The first rotating member 46 is disposed on the radially outer side of the front-wheel axle 26R, and is supported so as to be rotatable about the same axis CL1 as the front-wheel axle 26. More specifically, the axially opposite ends of the first rotating member 46 are supported by ball bearing 56, 57 so as to be rotatable about the axis CL1. An axial end portion of the first rotating member 46 closer to the front differential 17 (on the left-hand side in FIG. 2) is spline-fitted to the differential case 17a, so that the first rotating member 46 rotates as a unit with the differential case 17a about the axis CL1.

The second rotating member 50 is disposed on the radially outer side of the first rotating member 46, so as to be rotatable about the axis CL1. More specifically, the second rotating member 50 is rotatably supported by a double-row angular ball bearing 58 in a cantilever fashion. The Fr ring gear 32 that meshes with the driven pinion gear 34 is fixed to the outer periphery of an end portion of the second rotating member 50 closer to the front differential 17 as viewed in the direction of the axis CL1.

The Fr dog clutch 28 is mounted such that it can connect and disconnect the first rotating member 46 to and from the second rotating member 50. The Fr dog clutch 28 includes an annular movable sleeve 60 formed at its outer periphery with meshing teeth 60a, and meshing teeth 62 formed on an axial end of the second rotating member 50 closer to the front differential 17 as viewed in the axial direction. The inner periphery of the movable sleeve 60 is spline-fitted to the first rotating member 46 such that the sleeve 60 cannot rotate relative to the first rotating member 46, and is movable relative to the first rotating member 46 in the direction of the axis CL1. With this arrangement, the sleeve 60 is movable between a position indicated on the lower side of the axis CL1 of the front-wheel axle 26 of FIG. 2, and a position indicated on the upper side of the axis CL1 of the front-wheel axle 26 of FIG. 2.

When the movable sleeve 60 is moved to the position indicated on the lower side of the axis CL1 of the front-wheel axle 26 of FIG. 2, the meshing teeth 60a of the movable sleeve 60 are brought into meshing engagement with the meshing teeth 62, so that the first rotating member 46 and the second rotating member 50 are connected to each other. Namely, the Fr dog clutch 28 is engaged. At this time, the four-wheel drive system 8 is placed in a four-wheel drive state in which a part of the drive power delivered from the engine 10 is transmitted to the propeller shaft 20 side (rear wheels 14 side) via the transfer case 18.

When the movable sleeve 60 is moved to the position indicated on the upper side of the axis CL1 of the front-wheel axle 26 of FIG. 2, meshing engagement between the meshing teeth 60a of the movable sleeve 60 and the meshing teeth 62 is released, so that the first rotating member 46 and the second rotating member 50 are disconnected from each other. Namely, the Fr dog clutch 28 is disengaged. At this time, the four-wheel drive system 8 is placed in a two-wheel drive state in which the drive power delivered from the engine 10 is transmitted only to the front wheels 12 side, without being transmitted to the propeller shaft 20 side (rear wheels 14 side).

A spring 64 is mounted between the ball bearing 56 and the movable sleeve 60 as viewed in the direction of the axis C1. The spring 64 biases the movable sleeve 60 toward the ball bearing 57 in the direction of the axis L1, namely, biases the movable sleeve 60 to a position at which the meshing teeth 60a of the movable sleeve 60 mesh with the meshing teeth 62.

The first thrust amplification mechanism 54 is provided in radial space between the first rotating member 46 and the second rotating member 50. The first thrust amplification mechanism 54 includes a first cam 66, a second cam 68, a plurality of balls 70 inserted between the first cam 66 and the second cam 68 in the direction of the axis CL1, a piston 72, and a spring 74 inserted between the piston 72 and the second cam 68. The first cam 66 is rotatable about the axis CL1 of the front-wheel axle 26. The second cam 68 is rotatable about the axis CL1, like the first cam 66, and is movable in the direction of the axis CL1. The piston 72, when it abuts on the second cam 68, is movable along with the second cam 68 in the direction of the axis CL1. The spring 74 biases the second cam 68 toward the first cam 66 in the direction of the axis CL1.

The first cam 66 is formed in an annular shape, and its inner circumferential surface is slidably fitted on an outer circumferential surface of the first rotating member 46. An inside clutch plate that constitutes the Fr dog operation clutch 30 is splined-fitted to the outer periphery of the first cam 66. The second cam 68 is formed in an annular shape, and its inner periphery is spline-fitted to the outer periphery of the first rotating member 46, such that the second cam 68 cannot rotate relative to the first rotating member 46, and is movable relative to the first rotating member 46 in the direction of the axis CL1. The second cam 68 is formed with an extended portion 73 that protrudes from an end portion of the cam 68 remote from the first cam 66 in the direction of the axis CL1, toward the piston 72 in the direction of the axis CL, and an axial end of the extended portion 73 abuts on the piston 72.

Cam grooves 69, 71, each of which is formed in arcuate shape along the circumferential direction, are formed in mutually opposed faces of the first cam 66 and the second cam 68, and the balls 70 are received in the pair of grooves 69, 70. Each of the cam grooves 69, 71 is formed such that a circumferentially middle portion of the groove has a large depth, and the depth is reduced toward circumferentially end portions.

In a condition where the first cam 66 and the second cam 68 rotate as a unit, the balls 70 are moved to a position where they contact with large-depth portions of the cam grooves 69, 71, since the second cam 68 is biased by the spring 74 toward the first cam 66. On the other hand, when the first cam 66 and the second cam 68 rotate relative to each other, the balls 70 move in the circumferential direction along the cam groove 69 of the first cam 66 and the cam groove 71 of the second cam 68, so that the balls 70 contact with small-depth portions of the cam grooves 69, 71. As a result, the first cam 66 and the second cam 68 are pushed away from each other in the direction of the axis CL1. At this time, the second cam 68 is moved away from the first cam 66, namely, toward the piston 72 in the direction of the axis CL1. As the second cam 68 is moved in the direction of the axis CL1, the piston 72 that is in contact with the second cam 68 is also moved in the direction of the axis CL1, and the movable sleeve 60 located adjacent to the piston 72 via a thrust bearing is also moved in the direction of the axis CL1, against the bias force of the spring 64. In this manner, the movable sleeve 60 is moved in the direction of the axis CL1, by means of the first thrust amplification mechanism 54.

The Fr dog operation clutch 30 is provided for controlling operation of the first thrust amplification mechanism 54. The Fr dog operation clutch 30 is provided on the radially outer side of the first cam 66. The Fr dog operation clutch 30 controls the operating state of the first thrust amplification mechanism 54, by reducing the rotational speed of the first cam 66, through engagement (full engagement) or slipping engagement of the first cam 66 that constitutes the first thrust amplification mechanism 54, with a transfer housing 76 as a non-rotating member, and providing a difference in the rotational speed between the first cam 66 and the second cam 68.

The Fr dog operation clutch 30 includes a disc-like inside clutch plate or plates, disc-like outside clutch plate or plates, and an armature 78. The inside clutch plate is spline-fitted to the outer periphery of the first cam 66, such that it cannot rotate relative to the first cam 66, and is movable relative to the first cam 66 in the direction of the axis CL1. The outside clutch plate is alternately superposed on the inside clutch plate, and its outer periphery is spline-fitted to the transfer housing 76 such that the outside clutch plate cannot rotate relative to the transfer housing 76, and is movable relative to the transfer housing 76 in the direction of the axis CL1. Like the outside clutch plate, the outer periphery of the armature 78 is spline-fitted to the transfer housing 76, such that the armature 78 cannot rotate relative to the transfer housing 76, and is movable relative to the transfer housing 76 in the direction of the axis CL1. The inside clutch plate and the outside clutch plate provide friction elements 80 of the Fr dog operation clutch 30.

The first electromagnetic solenoid 52 is located at a position that radially overlaps the friction elements 80 of the Fr dog operation clutch 30 and the armature 78, as viewed in the direction of the axis CL1. When current flows through the first electromagnetic solenoid 52, magnetic flux appears around the first electromagnetic solenoid 52, and the armature 78 is attracted toward the first electromagnetic solenoid 52 in the direction of the axis L1. At this time, the armature 78 presses the friction elements 80, so as to engage or slip-engage the Fr dog operation clutch 30. As a result, rotation inhibition torque proportional to the current of the first electromagnetic solenoid 52 is applied to the first cam 66, so that the rotational speed of the first cam 66 is reduced, or rotation of the first cam 66 is stopped.

As the rotational speed of the first cam 66 is reduced, or rotation of the first cam 66 is stopped, the first cam 66, and the second cam 68 that rotates as a unit with the first rotating member 46, rotate relative to each other. Therefore, the first thrust amplification mechanism 54 is actuated, so that the second cam 68, piston 72, and the movable sleeve 60 are moved toward the front differential 17 in the direction of the axis CL1. Thus, the operating state of the first thrust amplification mechanism 54 is controlled by controlling the current flowing through the first electromagnetic solenoid 52, and thus adjusting the rotational speed of the first cam 66.

A first holder 82 that functions as a fixing mechanism (retaining mechanism) for holding the Fr dog clutch 28 in the engaged/disengaged state is provided on the inner periphery of the extended portion 73 of the second cam 68. The first holder 82 is formed in an annular shape, and is fixed to the first rotating member 46 such that it cannot rotate relative to the first rotating member 46, and cannot move in the direction of the axis CL1. Also, engaging teeth 82a shown in FIG. 3 for retaining the piston 72 are formed on an outer circumferential surface of the first holder 82.

Figure 3:
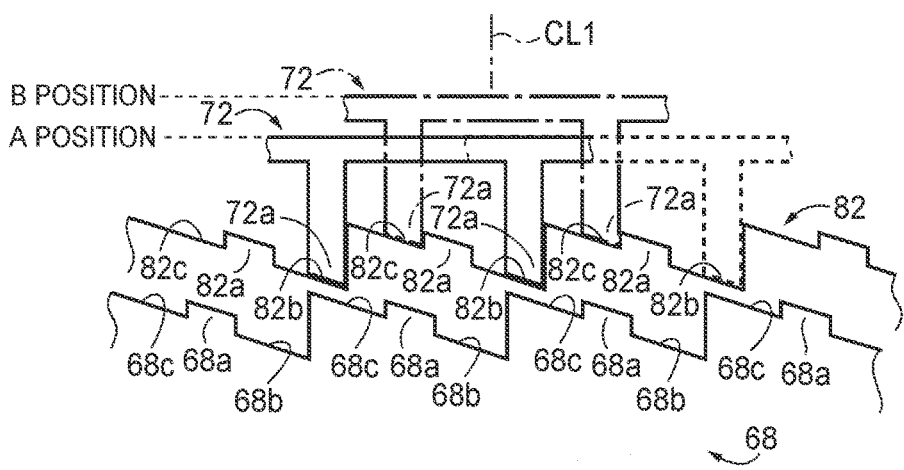
FIG. 3 is a schematic view useful for explaining the operation principle of retaining a piston by use a first holder of FIG. 2.

FIG. 3 is a schematic view useful for explaining the operating principle of retaining the piston 72 by means of the first holder 82. In FIG. 3, the second cam 68, piston 72, and the first holder 82 are deployed in the circumferential direction, to be laid flat. In FIG. 3, the vertical direction on the paper corresponds to the direction of the axis CL1, and the lateral direction on the paper corresponds to the circumferential direction (direction of rotation). Although not illustrated in FIG. 3, the piston 72 is normally biased by the spring 64 toward the second cam 68 in the direction of the axis CL1.

As shown in FIG. 3, an outer peripheral end face of the first holder 82 closer to the piston 72 in the direction of the axis CL1 (the upper side on the paper of FIG. 3) is formed in a saw-tooth pattern, to provide periodic inclined surfaces. At around the middle of each inclined surface as viewed in the direction of rotation, a retaining protrusion 82a that protrudes in the direction of the axis CL1 is formed. Thus, the inclined surface is divided into an inclined surface 82b, an inclined surface 82c, and the retaining protrusion 82a sandwiched between the inclined surfaces 82b, 82c. An end portion (top portion) of the retaining protrusion 82a in the direction of the axis CL1 is also formed with an inclined surface parallel to each inclined surface 82b, 82c.

An outer peripheral end face of the second cam 68 closer to the piston 72 in the direction of the axis CL1 is also formed in a saw-tooth pattern, to provide periodic inclined surfaces. At around the middle of each inclined surface, a retaining protrusion 68a that protrudes in the direction of the axis CL1 is formed. Thus, the inclined surface is divided into an inclined surface 68b, inclined surface 68c, and the retaining protrusion 68a sandwiched between the inclined surfaces 68b, 68c. An end portion (top portion) of the retaining protrusion 68a in the direction of the axis CL1 is also formed with an inclined surface parallel to each inclined surface 68b, 68c.

Also, protruding portions 72a are periodically formed on an end portion of the piston 72 which faces the second cam 68 and the first holder 82 in the direction of the axis CL1. The protruding portions 72a are formed with inclined surfaces parallel to each inclined surface of the second cam 68 and the first holder 82.

The piston 72 at "A" position indicated by solid lines in FIG. 3 is in a condition where the inclined surfaces of the protruding portions 72a abut on the inclined surfaces 82b of the first holder 82, namely, a condition where the piston 72 is held at "A" position by means of the first holder 82. In this condition, the piston 72 is placed in a condition where it is moved toward the second cam 68 in the direction of the axis CL1. This condition corresponds to the condition of the lower side of the axis CL1 of FIG. 2, in which the meshing teeth 60a and meshing teeth 62 of the Fr dog clutch 28 are in meshing engagement with each other.

If the second cam 68 in this condition makes one reciprocating motion, the inclined surfaces formed on the protruding portions 72a of the piston 72 abut on the inclined surfaces 68c of the second cam 68, and the piston 72 is brought up by the second cam 68 toward the movable sleeve 60 (upward on the paper of FIG. 3) in the direction of the axis CL1. Here, if the inclined surfaces 68c of the second cam 68 move to be closer to the movable sleeve 60 than the inclined surfaces 82c of the first holder 82, the protruding portions 72a of the piston 72 move to the right on the paper, along the inclined surfaces 68c. Also, if the second cam 68 returns downward on the paper, the inclined surfaces of the protruding portions 72a abut on the inclined surfaces 82c of the first holder 82, and further move along the inclined surfaces 82c, so that the piston 72 is retained at "B" position indicated by one-dot chain lines. In this condition, the piston 72 moves toward the movable sleeve 60 in the direction of the axis CL1, and is held in the condition on the upper side of the axis CL1 of FIG. 2.

If the second cam 68 further makes one reciprocating motion, from the condition in which the piston 72 is retained at "B" position indicated by the one-dot chain lines, the inclined surfaces of the protruding portions 72a abut on the inclined surfaces formed on the retaining protrusions 68a of the second cam 68, and the piston 72 is brought up by the second cam 68 toward the movable sleeve 60 in the direction of the axis CL1. Here, if the inclined surfaces of the retaining protrusions 68 of the second cam 68 move to be closer to the movable sleeve 60 in the direction of the axis CL1 than the inclined surfaces formed on the retaining protrusions 82a of the first holder 82, the protruding portions 72a of the piston 72 move along the inclined surfaces of the retaining protrusions 68 and the inclined surfaces 82b of the first holder 82, so that the piston 72 is retained at "A" position as indicated by broken lines. Thus, each time the second cam 68 makes one reciprocating motion, the piston 72 is alternately switched between "A" position in which the Fr dog clutch 28 is engaged, and "B" position in which the Fr dog clutch 28 is disengaged. In a condition where the second cam 68 is not in operation, the piston 72 is mechanically held at either "A" position or "B" position, by the first holder 82.

Figure 4:
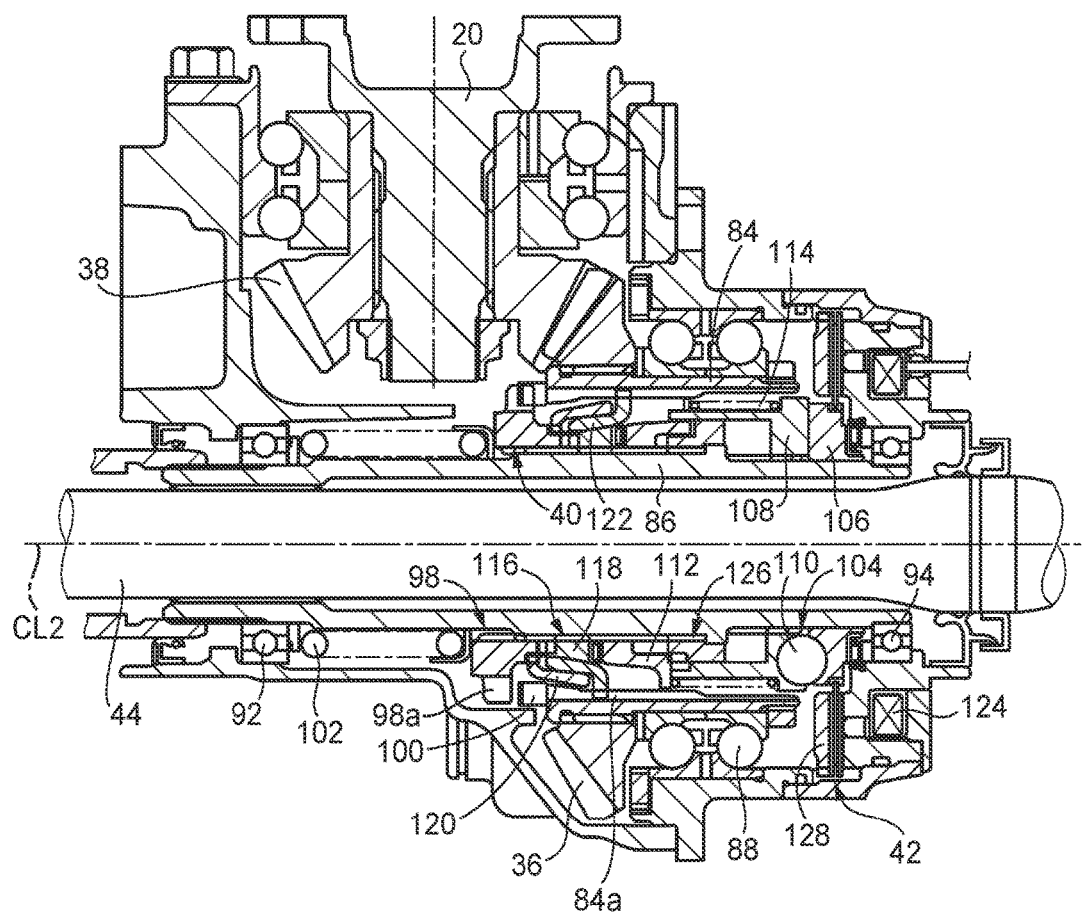
FIG. 4 is a cross-sectional view showing the structure around a Rr dog clutch provided in a rear differential of FIG. 1.

FIG. 4 is a cross-sectional view showing the structure around the Rr dog clutch 40 included in the rear differential 24. The rear differential 24 includes a cylindrical third rotating member 84 that is rotatable about a rotational axis CL2 (axis CL2), a cylindrical fourth rotating member 86 that is rotatable about the axis CL2, and a Rr dog clutch 40 mounted such that it can connect and disconnect the third rotating member 84 and the fourth rotating member 86 to and from each other. The rear differential 24 further includes a second thrust amplification mechanism 104 that generates thrust force for switching the Rr dog clutch 40 between an engaged state and a disengaged state, a Rr dog operation clutch 42 for operating the Rr dog clutch 40 via the second thrust amplification mechanism 104, and a second electromagnetic solenoid 124 for adjusting the torque capacity of the Rr dog operation clutch 42.

The third rotating member 84 is rotatably supported by a double-row angular ball bearing 88. The Rr ring gear 36 that meshes with the drive pinion gear 38 of the propeller shaft 20 is fixed to the outer periphery of the third rotating member 84. Also, spline teeth 84a are formed on the inner periphery of the third rotating member 84.

The fourth rotating member 86 is rotatably supported by ball bearings 92, 94 disposed at the opposite sides in the direction of the axis CL2. The fourth rotating member 86 is spline-fitted to the rear-wheel axle 44, so as to rotate as a unit with the rear-wheel axle 44.

The Rr dog clutch 40 is mounted such that it can connect and disconnect the third rotating member 84 and the second rotating member 86 to and from each other. The Rr dog clutch 40 includes an annular movable sleeve 98 having meshing teeth 98a formed on its outer periphery, meshing teeth 100 formed on an axial end of the third rotating member 84 closer to the left rear wheel 14L (on the left-hand side on the paper) in the direction of the axis CL2, and a synchro mechanism 116. The movable sleeve 98 is spline-fitted to the fourth rotating member 86 such that the sleeve 98 cannot rotate relative to the fourth rotating member 86, and is movable relative to the fourth rotating member 86 in the axial direction.

When the movable sleeve 98 is moved toward the left rear wheel 14L in the direction of the axis CL2, meshing engagement between the meshing teeth 98a of the movable sleeve 98 and the meshing teeth 100 is released, as indicated on the lower side of the axis CL2 of FIG. 4, so that the third rotating member 84 and the fourth rotating member 86 are disconnected from each other. Namely, the Rr dog clutch 40 is disengaged. On the other hand, when the movable sleeve 98 is moved toward the right rear wheel 14R (to the right on the paper) in the direction of the axis CL2, the meshing teeth 98a of the movable sleeve 98 and the meshing teeth 100 are brought into meshing engagement with each other, as indicated on the upper side of the axis CL2 of FIG. 4. At this time, the third rotating member 84 and the fourth rotating member 86 are connected to each other. Namely, the Rr dog clutch 40 is engaged.

A spring 102 for biasing the movable sleeve 98 toward the right rear wheel 14R (to the right on the paper) in the direction of the axis CL2 is provided between the ball bearing 92 and the movable sleeve 98 in the direction of the axis CL2.

The second thrust amplification mechanism 104 is provided in radial space between the third rotating member 84 and the fourth rotating member 86. The second thrust amplification mechanism 104 includes a first cam 106 disposed on an outer circumferential surface of the fourth rotating member 86, a second cam 108 that is spline-fitted to the third rotating member 84 such that is cannot rotate relative to the third rotating member 84, and is movable in the direction of the axis CL2, a plurality of balls 110 inserted between the first cam 106 and the second cam 108, a piston 112, and a spring 114. The piston 112 abuts on the second cam 108, so that it can move along with the second cam 108 in the direction of the axis CL2. The spring 114 is inserted between the piston 112 and the second cam 108, so as to bias the second cam 108 toward the first cam 106 in the direction of the axis CL2. The structure and operation of the second thrust amplification mechanism 104 are basically identical with those of the first thrust amplification mechanism 54 as described above, and therefore, detailed description will not be provided.

The synchro mechanism 116 is provided between the piston 112 and the movable sleeve 98 in the direction of the axis CL2. The synchro mechanism 116 is operable to synchronize rotation of the third rotating member 84 on which the meshing teeth 100 are formed, with that of the movable sleeve 98 on which the meshing teeth 98a are formed, namely, synchronize rotation of the Rr dog clutch 40. The synchro mechanism 116 includes a synchro ring 118, a friction member 120 that is fitted on the movable sleeve 98 such that it cannot rotate relative to the sleeve 98, and is movable relative to the sleeve 98 in the direction of the axis CL2, and a friction member 122 that is fitted on the third rotating member 84 such that it cannot rotate relative to the third rotating member 84, and is movable relative to the member 84 in the direction of the axis CL2.

The synchro ring 118 is formed in an annular shape, and its inner periphery is spline-fitted to the fourth rotating member 86, such that the synchro ring 118 cannot rotate relative to the fourth rotating member 86, and is movable relative to the member 86 in the direction of the axis CL2. A thrust bearing is inserted between the synchro ring 118 and the piston 112.

The friction member 120 is formed in a conical shape, and its radially inner end portion is spline-fitted to the movable sleeve 98. Also, the friction member 122 is formed in a conical shape, and its radially outer portion is spline-fitted to the third rotating member 84. An inclined surface on the inner periphery of the friction member 120 is in sliding contact with an inclined surface on the outer periphery of the friction member 122. Further, an inclined surface on the inner periphery of the friction member 122 is in sliding contact with an inclined surface formed on the outer periphery of the synchro ring 118.

In the synchro mechanism 116 constructed as described above, when the synchro ring 118 is pressed by the piston 112 toward the movable sleeve 98 in the direction of the axis CL2, frictional force is generated between sliding contact surfaces of the synchro ring 118 and the friction member 122, and between sliding contact surfaces of the friction member 122 and the friction member 120. With the frictional force thus generated, the third rotating member 84 and the movable sleeve 98 are rotated in synchronization with each other. Namely, the Rr dog clutch 40 rotates in synchronization. If the third rotating member 84 and the movable sleeve 98 are rotated in synchronization with each other, shock that would occur when the meshing teeth 98a and the meshing teeth 100 are engaged with each other is suppressed or reduced in the Rr dog clutch 40.

The Rr dog operation clutch 42 including friction elements and an armature 128 is provided on the radially outer side of the first cam 106. The structure and operation of the Rr dog operation clutch 42 are basically identical with those of the Fr dog operation clutch 30 as described above, and therefore, will not be described herein. Also, a second electromagnetic solenoid 124 for adjusting the torque capacity of the Rr dog operation clutch 42 is provided at a position located adjacent to the Rr dog operation clutch 42 in the direction of the axis CL2, which position is the same radial position as the that of the Rr dog operation clutch 42.

A second holder 126 that functions as a fixing mechanism (retaining mechanism) for holding the Rr dog clutch 40 in the engaged/disengaged state is provided between the piston 112 and the second cam 108 in the direction of the axis CL2. The second holder 126 is formed in an annular shape, and is fixed to the fourth rotating member 86 such that it cannot rotate relative to the member 86, and is movable relative to the member 86 in the direction of the axis CL2. The structure and function of the second holder 126 are basically identical with those of the first holder 82 as describe above, and therefore, detailed description of the second holder 126 will not be provided.

Figure 5A:
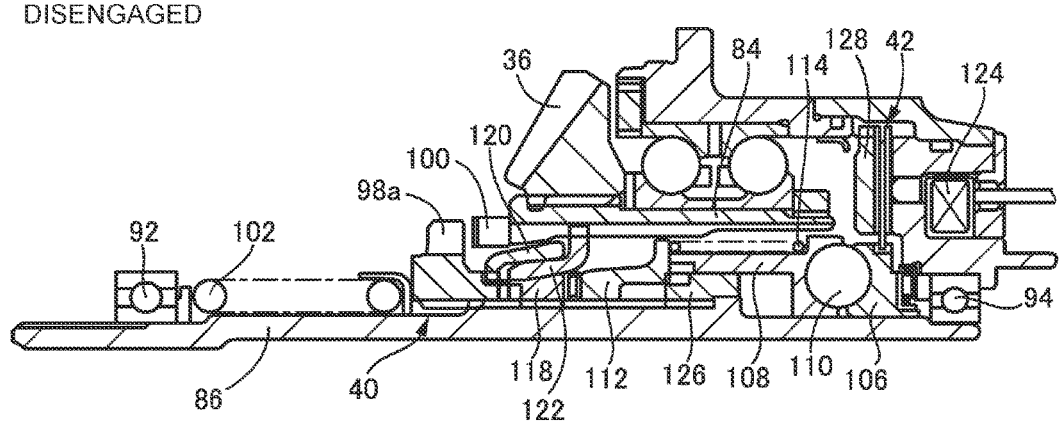
FIG. 5A is one of views showing transient conditions of the Rr dog clutch of FIG. 4 in a stepwise fashion when the clutch is switched from a disengaged state to an engaged state.
Figure 5B:
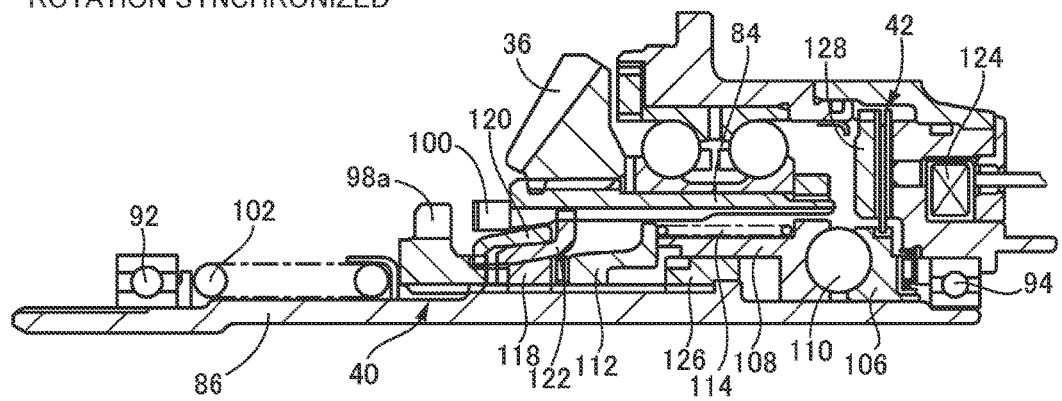
FIG. 5B is one of views showing transient conditions of the Rr dog clutch of FIG. 4 in a stepwise fashion when the clutch is switched from a disengaged state to an engaged state.
Figure 5C:
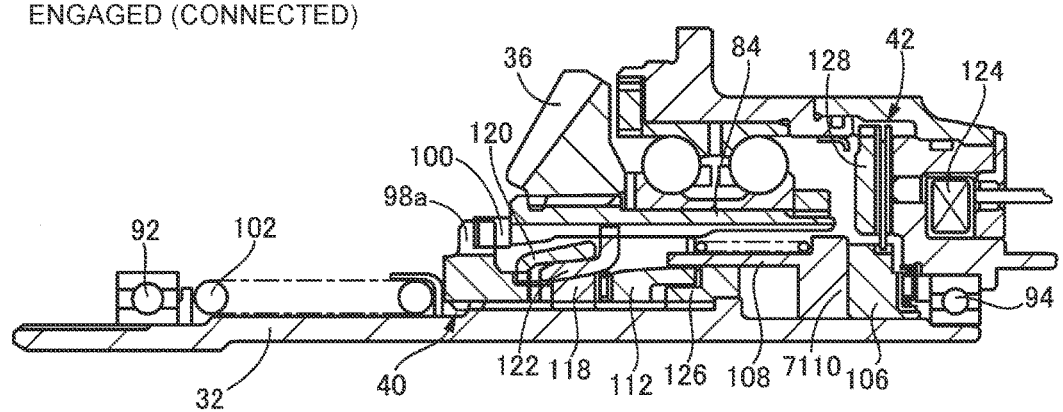
FIG. 5C is one of views showing transient conditions of the Rr dog clutch of FIG. 4 in a stepwise fashion when the clutch is switched from a disengaged state to an engaged state.
Figure 6:
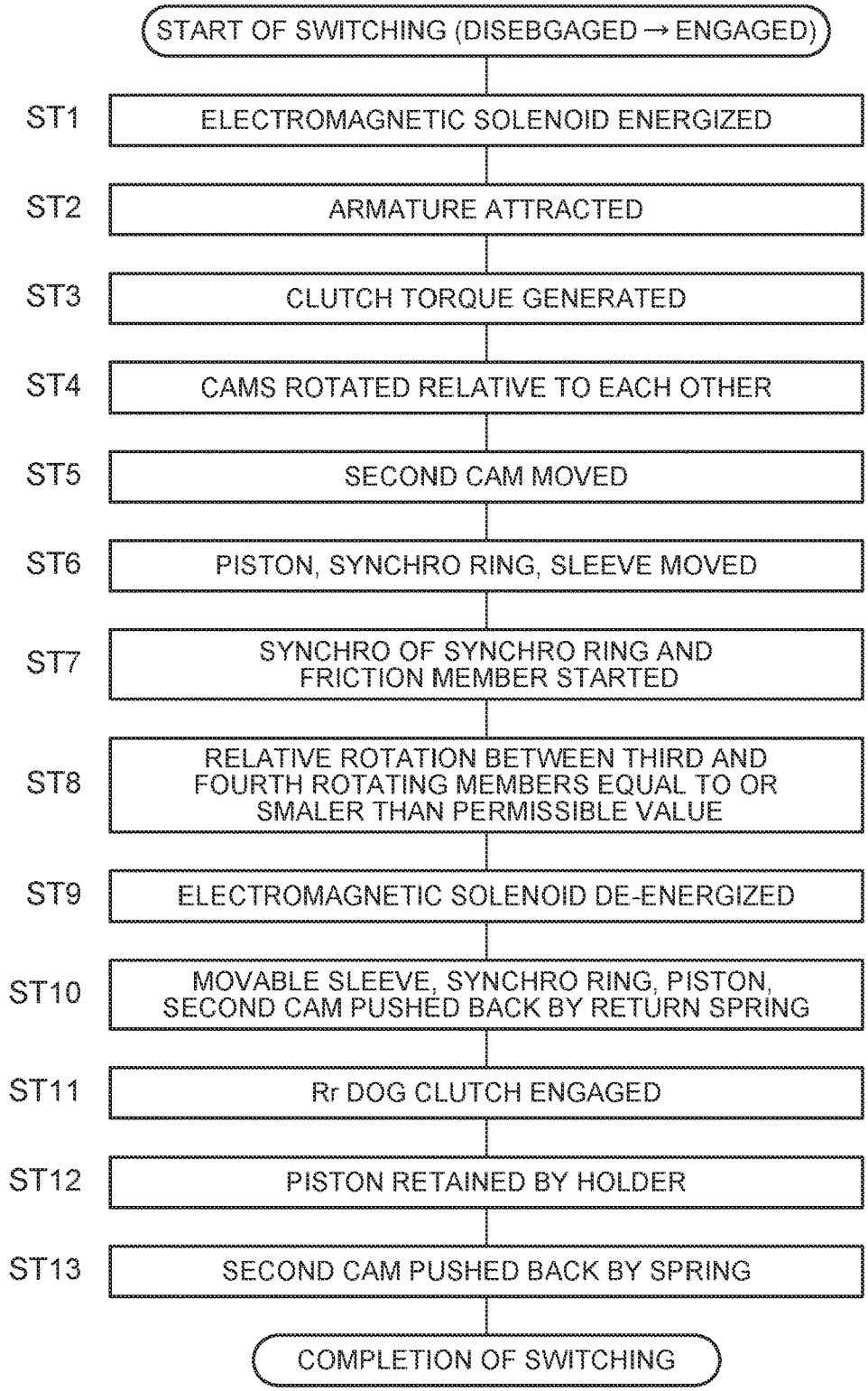
FIG. 6 is a flowchart illustrating the process of switching the Rr dog clutch from the disengaged state to the engaged state, in a transient period.

FIG. 5A, FIG. 5B, and FIG. 5C show transient conditions of the Rr dog clutch 40 when it is switched from the disengaged state to the engaged state, in a step-by-step manner. FIG. 6 is a flowchart illustrating the process of switching from the disengaged state of the Rr dog clutch 40 to the engaged state in a transient period. The flowchart shown in FIG. 6 is basically identical with that showing transient conditions of the Fr dog clutch 28, except that no synchro mechanism operates in the Fr dog clutch 28.

In a condition where the Rr dog clutch 40 is disengaged, the piston 112 is retained at the position shown in FIG. 5A, by means of the second holder 126, so that meshing engagement between the meshing teeth 98a of the movable sleeve 98 and the meshing teeth 100 is released, and the third rotating member 84 and the fourth rotating member 86 are disconnected from each other (namely, the Rr dog clutch is disengaged).

In this condition, if the second electromagnetic solenoid 124 is energized in step ST1 shown in FIG. 6, the armature 128 (see FIG. 5A-FIG. 5C) that constitutes the Rr dog operation clutch 42 is attracted toward the second electromagnetic solenoid 124 in step ST2, and clutch torque corresponding to a current value of the second electromagnetic solenoid 124 is generated in the Rr dog operation clutch 42 in step ST3. At this time, the first cam 106 and the second cam 108 rotate relative to each other in step ST4, and the second cam 108 moves away from the first cam 106 in step ST5. Accordingly, in step ST6, the piston 112, synchro ring 118, and the movable sleeve 98 move toward the ball bearing 92 in the direction of the axis CL2. Also, the synchro ring 118 is pressed by the piston 112, so that the synchro mechanism 116 operates in step ST7, and frictional force is generated between the synchro ring 118 and the friction member 122, and between the friction member 120 and the friction member 122. With the frictional force thus generated, the third rotating member 84 and the fourth rotating member 86 rotate in synchronization with each other.

FIG. 5B shows a condition of a synchronization transient period established by operating the synchro mechanism 116. As shown in FIG. 5B, the piston 112 is moved by the second cam 108, to a position at which the piston 112 is spaced apart from the second holder 126, and the piston 112 presses the synchro ring 118. Further, the synchro ring 118 presses the friction member 122, and the friction member 122 presses the friction member 120, so as to generate frictional force, and the third rotating member 84 and the movable sleeve 98 rotate in synchronization with each other.

If the relative rotational speed between the third rotating member 84 and the fourth rotating member 86 becomes equal to or smaller than a permissible value in step ST8, electric current applied to the second electromagnetic solenoid 124 is cut off (i.e., the second electromagnetic solenoid 124 is de-energized) in step ST9. As a result, in step ST10, clutch torque of the Rr dog operation clutch 42 becomes equal to zero, and the first cam 106 and the second cam 108 stops rotating relative to each other; therefore, the movable sleeve 98, synchro ring 118, piston 112, and the second cam 108 are pushed back by the spring 102. As a result, in step ST11, the meshing teeth 98a of the movable sleeve 98 and the meshing teeth 100 are brought into meshing engagement with each other, so that the Rr dog clutch 40 is engaged. In step ST12, the piston 112 pushed back by the spring 102 is retained by the second holder 126, and the Rr dog clutch 40 is held in the engaged state. Further, in step ST13, the second cam 108 is pushed back toward the first cam 106, by means of the spring 114.

FIG. 5C shows a condition where engagement of the Rr dog clutch 40 is completed (completion of switching). As shown in FIG. 5C, the piston 112 is retained by the second holder 126, so that the meshing teeth 98a of the movable sleeve 98 and the meshing teeth 100 are kept in meshing engagement. Also, the second cam 108 is moved toward the first cam 106 by the spring 114.

In the four-wheel drive system 8 constructed as described above, during two-wheel driving, the Fr dog clutch 28 and the Rr dog clutch 40 are disengaged, so that no rotation is transmitted to any rotating member (such as the propeller shaft 20) that constitutes the power transmission pathway between the Fr dog clutch 28 and the Rr dog clutch 40. Thus, during two-wheel driving, dragging of the propeller shaft 20, etc. is prevented, and the fuel efficiency is improved. In particular, the Fr dog clutch 28 and the Rr dog clutch 40 do not cause dragging, as compared with hydraulic friction clutches, or the like; therefore, the fuel efficiency is more effectively improved.

On the other hand, during four-wheel driving, the Fr dog clutch 28 and the Rr dog clutch 40 are engaged, so that a part of the drive power delivered from the engine 10 is transmitted to the rear wheels 14, via the transfer case 18 (Fr dog clutch 28), propeller shaft 20, and the rear differential 24 (Rr dog clutch 40), for example.

As shown in FIG. 5A-FIG. 5C and FIG. 6, even if the third rotating member 84 and the movable sleeve 98 rotate relative to each other when the Rr dog clutch 40 disposed on the rear-wheel side is engaged, rotation of the Rr dog clutch 40 is synchronized by the synchro mechanism 116 provided along with the Rr dog clutch 40, so that shock that would occur at the time of engagement is suppressed or reduced. On the other hand, the Fr dog clutch 28 shown in FIG. 4 is not provided with the synchro mechanism; therefore, when there is a difference in the rotational speed between the movable sleeve 60 on which the meshing teeth 60a are formed, and the second rotating member 50 on which the meshing teeth 62 are formed, at the time of engagement of the clutch 28, shock may occur due to collision between the meshing teeth, and NV (noise and vibration) may be deteriorated, when the meshing teeth 60a and the meshing teeth 62 are brought into meshing engagement with each other.

While the vehicle is traveling straight, for example, each vehicle wheel rotates at the same rotational speed. Accordingly, when the Rr dog clutch 40 is engaged, and the pair of control couplings 22 are controlled so as not to cause slipping, substantially no difference in the rotational speed arises between the movable sleeve 60 and the second rotating member 50. Meanwhile, during turning of the vehicle, the rotational speed of each vehicle wheel differs because the track of each wheel differs. Therefore, if the coupling torque Tcouple of each of the pair of control couplings 22 is not appropriately controlled, a difference in the rotational speed appears between the movable sleeve 60 (first rotating member 46) and the second rotating member 50, and shock occurs when the meshing teeth 60a and the meshing teeth 62 are brought into meshing engagement with each other.

Thus, when the four-wheel drive system 8 is switched from a two-wheel-drive mode to a four-wheel-drive mode during turning of the vehicle, the Fr dog clutch 28 and the Rr dog clutch 40 are engaged in the manners as described below, so that shock generated during switching to the four-wheel-drive mode is suppressed or reduced.

Figure 7:
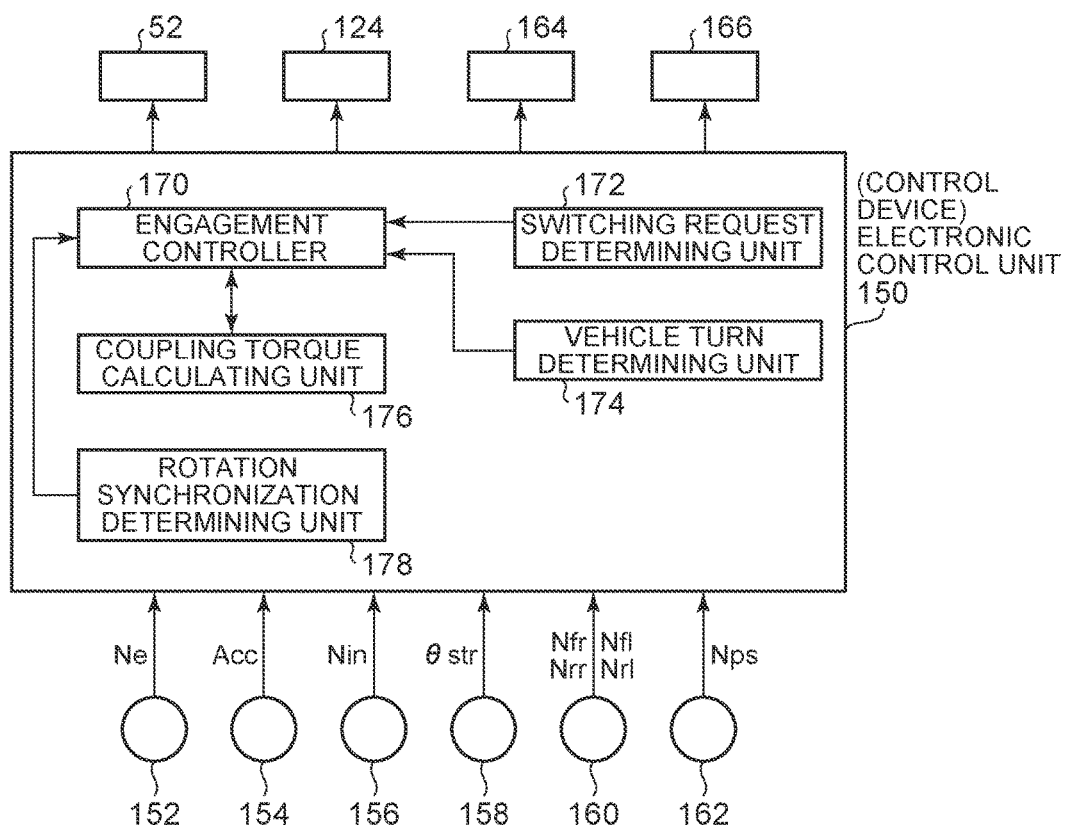
FIG. 7 is a functional block diagram useful for explaining control functions of an electronic control unit that controls switching between two-wheel driving and four-wheel driving.

FIG. 7 is a functional block diagram useful for explaining control functions of an electronic control unit 150 for controlling switching between the two-wheel-drive mode and the four-wheel-drive mode in the four-wheel drive system 8. For example, the electronic control unit 150 includes a so-called microcomputer having CPU, RAM, ROM, input and output interfaces, etc., and the CPU performs signal processing according to programs stored in advance in the ROM, utilizing the temporary storage function of the RAM, so as to switch the driving state of the four-wheel drive system 8, namely, execute control of switching between the two-wheel-drive mode and the four-wheel-drive mode. The electronic control unit 150 may be the same as an electronic control unit for engine control or an electronic control unit for shift control of the automatic transmission 16, or a separate electronic control unit for switching control may be provided.

The electronic control unit 150 receives a signal indicative of the engine speed Ne detected by an engine speed sensor 152, a signal indicative of the accelerator pedal stroke Acc corresponding to the amount of operation of the accelerator pedal detected by an accelerator pedal position sensor 154, a signal indicative of the input shaft rotational speed Nin of an input shaft of the automatic transmission 16 detected by an input shaft speed sensor 156, a signal indicative of the steering angle θstr corresponding to the amount of operation of the steering wheel detected by a steering sensor 158, a signal indicative of the rotational speed (Nfr, Nfl, Nrr, Nrl) of each wheel detected by a wheel speed sensor 160, a signal indicative of the rotational speed Nps of the propeller shaft 20 detected by a propeller shaft speed sensor 162, and so forth.

The electronic control unit 150 outputs a drive signal of the first electromagnetic solenoid 52 that controls the Fr dog operation clutch 30, a drive signal of the second electromagnetic solenoid 124 that controls the Rr dog operation clutch 42, a drive signal of an electromagnetic solenoid 164 for control of the left rear wheel (which will be called "left-rear-wheel solenoid 164") which controls the coupling torque Tcouple of the left control coupling 22L that adjusts transmission torque transmitted to the left rear wheel 14L, a drive signal of an electromagnetic solenoid 166 for control of the right rear wheel (which will be called "right-rear-wheel solenoid 166") which controls the coupling torque Tcouple of the right control coupling 22R that adjusts transmission torque transmitted to the right rear wheel 14R, and so forth. The left control coupling 22L is configured such that its coupling torque Tcouple (torque capacity) increases in proportion to a value of electric current delivered from the left-rear-wheel solenoid 164, and the right control coupling 22R is configured such that its coupling torque Tcouple (torque capacity) increases in proportion to a value of current delivered from the right-rear-wheel solenoid 166.

The electronic control unit 150 functionally includes an engagement controller 170 corresponding to an engagement control means, a switching request determining unit 172 corresponding to a switching request determining means, a vehicle turn determining unit 174 corresponding to a vehicle turn determining means, a coupling torque calculating unit 176 corresponding to a coupling torque calculating means, and a rotation synchronization determining unit 178 corresponding to a rotation synchronization determining means. The engagement controller 170, vehicle turn determining unit 174, and the coupling torque calculating unit 176 corresponds to a controller of the disclosure.

The switching request determining unit 172 determines whether a switching request (command) for switching to the four-wheel-drive mode during two-wheel driving is to be generated. For example, the switching request determining unit 172 stores a preset drive region map that specifies the drive state of the four-wheel drive system 8, using various parameters, such as the vehicle speed V, accelerator pedal stroke Acc, and the steering angle θstr. If the switching request determining unit 172 determines that the drive region has switched from a two-wheel-drive region to a four-wheel-drive region, it outputs a request for switching to the four-wheel-drive mode.

If the switching request is generated from the switching request determining unit 172, the engagement controller 170 starts switching control for switching from the two-wheel-drive mode to the four-wheel-drive mode. More specifically, the engagement controller 170 switches the four-wheel drive system 8 to the four-wheel-drive mode, by engaging the Fr dog clutch 28 and the Rr dog clutch 40, from a two-wheel drive state in which the Fr dog clutch 28 and the Rr dog clutch 40 are disengaged.

If the switching request is generated, the engagement controller 170 initially executes engagement of the Rr dog clutch 40 that is rotated in synchronization by means of the synchro mechanism 116. If both of the movable sleeve 98 on which the meshing teeth 98a of the Rr dog clutch 40 are formed, and the third rotating member 84 on which the meshing teeth 100 are formed, stop being rotated at the time of engagement of the Rr dog clutch 40, it is difficult to engage the Rr dog clutch 40. On the other hand, the engagement controller 170 controls the coupling torque Tcouple of one or both of the control couplings 22L, 22R to a given value, so as to rotate the rear-wheel axle 44 and the movable sleeve 98. Once the rear-wheel axle 44 (movable sleeve 98) is rotated, the engagement controller 170 applies current to the second electromagnetic solenoid 124, so as to generate clutch torque in the Rr dog operation clutch 42, and operate the second thrust amplification mechanism 104. With the second thrust amplification mechanism 104 thus operated, the Rr dog clutch 40 is engaged. In the Rr dog clutch 40, if the second thrust amplification mechanism 104 is operated, the synchro mechanism 116 is operated along with the mechanism 104; therefore, even if there is a difference in the rotational speed between the third rotating member 84 and the movable sleeve 98 (fourth rotating member 86), the rotation of the Rr dog clutch 40 is synchronized by the synchro mechanism 116, so that shock that would occur upon engagement is suppressed or reduced.

Once the Rr dog clutch 28 is engaged, the vehicle turn determining unit 174 is executed. The vehicle turn determining unit 174 determines whether the vehicle is turning during traveling. The vehicle turn determining unit 174 determines whether the vehicle is turning, based on the steering angle θstr of the steering wheel, for example. If the vehicle is turning, the vehicle turn determining unit 174 also determines the turning direction, namely, determines whether the vehicle is turning right or left, based on the steering angle θstr. The vehicle turning, and the turning direction may also be determined based on the rotational speed of each wheel.

Initially, the case where it is determined by the vehicle turn determining unit 174 that the vehicle is turning will be described. If it is determined by the vehicle turn determining unit 174 that the vehicle is turning, the coupling torque calculating unit 176 calculates the rotational speed Nps (which will be called "target rotational speed Nps*") of the propeller shaft 20 at which the Fr dog clutch 28 achieves rotation synchronization. The rotation synchronization of the Fr dog clutch 28 means that the rotational speed of the second rotating member 50 on which the meshing teeth 62 are formed becomes equal to the rotational speed of the movable sleeve 60 on which the meshing teeth 60a are formed. The target rotational speed Nps* is calculated based on Eq. (1) below. In Eq. (1), Nfl denotes the rotational speed of the left front wheel 12L, and Nfr denotes the rotational speed of the right front wheel 12R, while vr denotes the gear ratio between the Fr ring gear 32 and the driven pinion gear 34. Eq. (1) indicates that the target rotational speed Nps* of the propeller shaft 20 is obtained by converting the average value of the rotational speeds of the left and right front wheels 12L, 12R into a value corresponding to the rotational speed Nps of the propeller shaft 20.

$$Nps^* = \{(Nfl+Nfr)/2\} \times vr \tag{1}$$

When the propeller shaft 20 rotates, the second rotating member 50 on which the meshing teeth 62 that constitute the Fr dog clutch 28 are formed rotates, via the driven pinion gear 34 and the Fr ring gear 32. Here, when the rotational speed Nps of the propeller shaft 20 reaches the target rotational speed Nps*, the rotational speed of the second rotating member 50 (meshing teeth 62) becomes equal to the rotational speed of the movable sleeve 60 on which the meshing teeth 60a are formed. Namely, the Fr dog clutch 28 rotates in synchronization.

Then, the vehicle turn determining unit 173 determines the turning direction, namely, determines whether the vehicle is turning right or left. In the following, the case of right turning will be described.

If it is determined by the vehicle turn determining unit 174 that the vehicle is turning right, the coupling torque calculating unit 176 calculates the coupling torque Tcouple of the left control coupling 22L required to raise the rotational speed Nps of the propeller shaft 20 to the target rotational speed Nps*, based on Eq. (2) below. This coupling torque Tcouple is torque with which the rotational speed Nps of the propeller shaft 20 reaches the target rotational speed Nps*, and the Fr dog clutch 28 rotates in synchronization.

$$Tcouple = Ia \times N^*/T^* \times (2\pi/60) \tag{2}$$

In Eq. (2), Ia [Nm^2] corresponds to the sum of the moments of inertia of respective rotating members that constitute a power transmission pathway between the control coupling 22 and the Fr dog clutch 28, which path includes a rotating body whose rotational speed is raised by the control coupling 22, more specifically, the rear-wheel axle 44 and the propeller shaft 20. If the coupling torque Tcouple of the control coupling 22 is controlled, when the rotational speed Nps of the propeller shaft 20 is raised to the target rotational speed Nps*, the rotating speed of each of rotating members starting with the rear-wheel axle 44, as well as the propeller shaft 20, is also raised. Accordingly, each of these rotating members needs to be taken into consideration. In this connection, the moment of inertia of each of these rotating members is also added. Since the center of rotation of the rear-wheel axle 44, etc. is different from that of the propeller shaft 20, the moment of inertia of each rotating member is corrected to a corresponding value (moment of inertia) obtained when the rotating member is rotated on the axis of the propeller shaft 20.

In Eq. (2) above, N* [rpm] corresponds to the target rotational speed of the above-mentioned rotating body at which the Fr dog clutch 28 rotates in synchronization. Here, the rotational speed of the rotating body is based on the rotational speed Nps of the propeller shaft 20. Accordingly, the target rotational speed N* is calculated as a rotational speed difference (Nps*−Nps) between the target rotational speed Nps* of the propeller shaft 20, and the rotational speed Nps as the detection value of the rotational speed of the propeller shaft 20. Since the rotational speed Nps of the propeller shaft 20 is equal to zero or substantially equal to zero, immediately after engagement of the Rr dog clutch 40, the target rotational speed N* substantially coincides with the target rotational speed Nps* of the propeller shaft 20.

In Eq. (2) above, T* corresponds to a target engagement time. The target engagement time T*, which is set in advance, is a target time from the start of control of the control coupling 22 to completion of the synchronization. It is, however, to be noted that T* is changed as needed, based on traveling conditions, such as the vehicle speed, and the oil temperature of the hydraulic oil. In Eq. (2), N*/T*×(2π/60) indicates the angular acceleration ω' of the rotating body. Namely, Eq. (2) indicates that the coupling torque Tcouple is calculated by multiplying the moment of inertia Ia and the angular acceleration ω' of the rotating body.

The engagement controller 170 controls the current command value of the left-rear-wheel solenoid 164, so that the coupling torque Tcouple of the left control coupling 22L calculated by the coupling torque calculating unit 176 becomes equal to the value calculated based on Eq. (2). Thus, the engagement controller 170 raises the rotational speed Nps of the propeller shaft 20, by controlling the coupling torque Tcouple of the left control coupling 22L to the calculated value, so that the rotational speed Nps of the propeller shaft 20 reaches the target rotational speed Nps*, and the Fr dog clutch 28 rotates in synchronization.

Figure 8A:
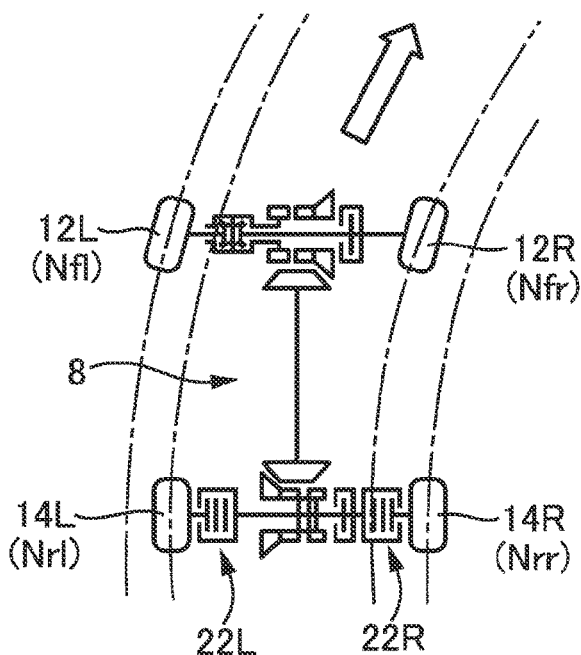
FIG. 8A is a view showing the track of each wheel of the four-wheel drive system while the vehicle is turning right.
Figure 8B:
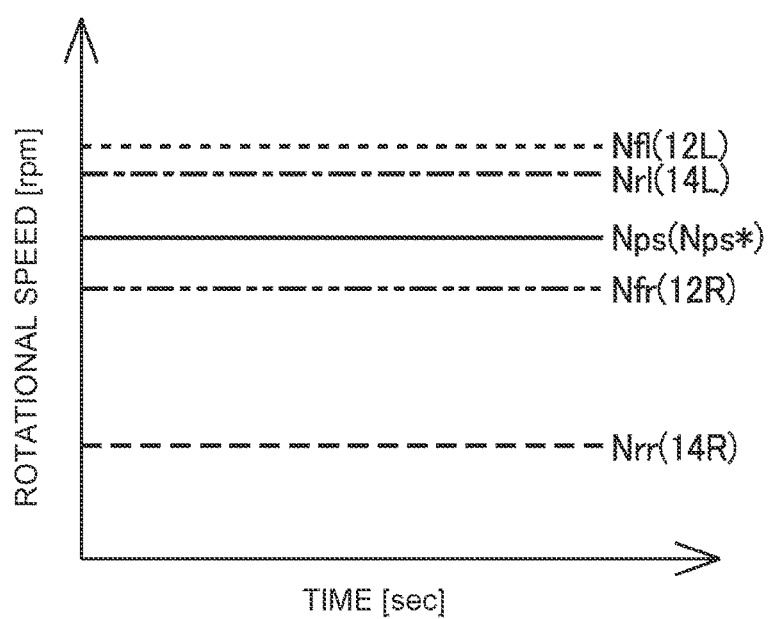
FIG. 8B is a view showing the rotational speed of each wheel while the vehicle is turning right.

When the vehicle turns right, the coupling torque Tcouple of the left control coupling 22L that transmits torque (power) to the left rear wheel 14L that provides an outer wheel during turning is controlled, because the rotational speed Nrl of the left rear wheel 14L is higher than the rotational speed Nrr of the right rear wheel 14R, during right turning of the vehicle. FIG. 8A shows the track of each wheel during right turning of the four-wheel drive system 8, and FIG. 8B shows the rotational speed of each wheel. In FIG. 8B, the rotational speed of each wheel is indicated as a value into which it is converted in terms of the rotational speed Nps of the propeller shaft 20.

In FIG. 8A, one-dot chain line that overlaps each wheel indicates the track of each (the) wheel during right turning. As shown in FIG. 8A, during right turning, the left front wheel 12L passes on the outermost side (left-hand side), and the left rear wheel 14L passes on the inner side (right-hand side) than the left front wheel 12L, while the right front wheel 12R passes on the inner side than the left rear wheel 14L, and the right rear wheel passes on the innermost side. In this connection, as shown in FIG. 8B, during right turning, the rotational speed Nfl of the left front wheel 12L is the highest (speed), and the rotational speed Nrl of the left rear wheel 14L is lower than the rotational speed Nfl, while the rotational speed Nfr of the right front wheel 12R is lower than the rotational speed Nrl, and the rotational speed Nrr of the right rear wheel 14R is the lowest (speed) (Nfl>Nrl>Nfr>Nrr).

In FIG. 8B, Nps denotes the rotational speed Nps of the propeller shaft 20 when the vehicle turns right in the four-wheel-drive mode, in other words, the target rotational speed Nps* of the propeller shaft 20. As shown in FIG. 8B, the rotational speed Nrl of the left rear wheel 14L is higher than the rotational speed Nps (target rotational speed Nps*) of the propeller shaft 20. Accordingly, it is possible to raise the rotational speed Nps of the propeller shaft 20 to the target rotational speed Nps*, by controlling the coupling torque Tcouple of the left control coupling 22L. Namely, rotation of the Fr dog clutch 28 can be synchronized. On the other hand, if the rotational speed Nps of the propeller shaft 20 is controlled by means of the right control coupling 22R, it cannot be raised to be higher than the rotational speed Nrr even when the right control coupling 22R is fully engaged. Thus, during right turning, the coupling torque Tcouple of the left control coupling 22L coupled to the left rear wheel 14L located on the turning outer wheel side. During left turning, the coupling torque Tcouple of the right control coupling 22R that transmits torque to the right rear wheel 14R located on the turning outer wheel side is controlled.

Figure 9:
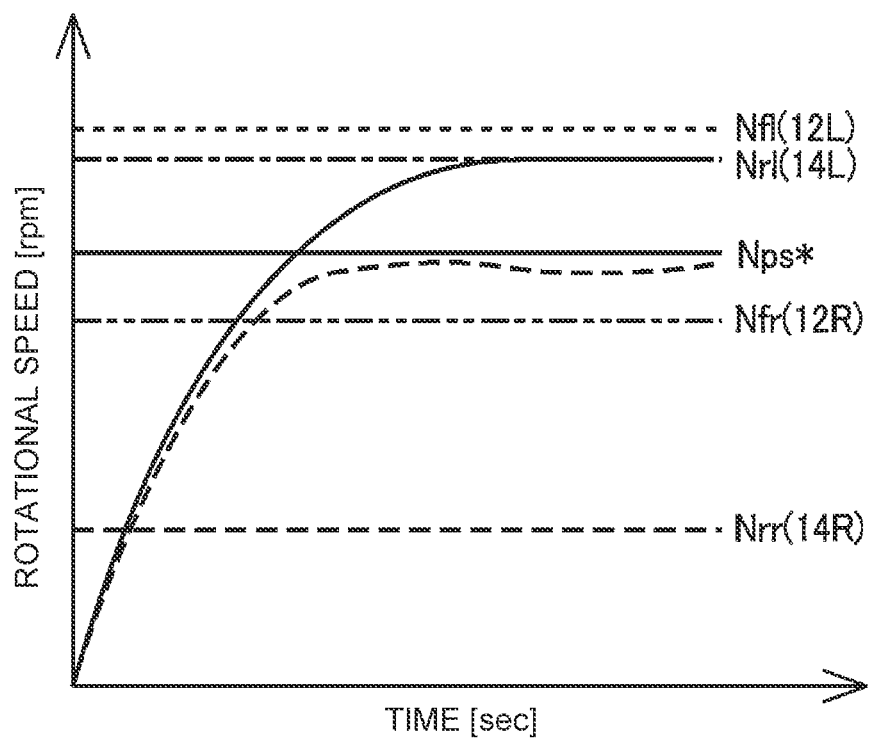
FIG. 9 is a view showing change of the rotational speed of a propeller shaft due to control of coupling torque of a left control coupling, while the vehicle is turning right.

FIG. 9 shows change of the rotational speed Nps of the propeller shaft 20 through control of the coupling torque Tcouple of the left control coupling 22L, during right turning. In FIG. 9, too, the rotational speed of each wheel is represented by a value corresponding to the rotational speed Nps of the propeller shaft 20. With the coupling torque Tcouple of the left control coupling 22L controlled to the value calculated according to Eq. (2) above, the rotational speed Nps of the propeller shaft 20 changes, as indicated by a broken line in FIG. 9, so as to follow the target rotational speed Nps* at which the Fr dog clutch 28 rotates in synchronization. When the left control coupling 22L is fully engaged, the rotational speed Nps of the propeller shaft 20 is raised to the rotational speed Nrl of the left rear wheel 14L, as indicated by a solid line in FIG. 9.

The rotation synchronization determining unit 178 determines whether rotation of the Fr dog clutch 28 has been synchronized, based on whether the rotational speed Nps of the propeller shaft 20 has reached the target rotational speed Nps*. When the propeller shaft 20 rotates at the target rotational speed Nps*, the rotational speed of the second rotating member 50 on which the meshing teeth 62 are formed becomes equal to the rotational speed of the movable sleeve 60, in the Fr dog clutch 28. Thus, the rotation synchronization determining unit 178 determines that rotation of the Fr dog clutch 28 has been synchronized, based on whether a rotational speed difference between the target rotational speed Nps*, and the rotational speed Nps of the propeller shaft 20 detected as needed by the propeller shaft speed sensor 162, becomes smaller than a preset given value α. The given value α is set in advance to a value small enough to determine that rotation of the Fr dog clutch 28 has been synchronized. When the rotational speed difference is equal to or larger than the given value α, it is determined that rotation has not been synchronized. When the rotational speed difference is smaller than the given value α, it is determined that rotation has been synchronized.

If the rotation synchronization determining unit 178 determines that rotation of the Fr dog clutch 28 has not been synchronized, the engagement controller 170 continues to perform control of the coupling torque Tcouple of the left control coupling 22L. On the other hand, if it is determined that rotation of the Fr dog clutch 28 has been synchronized, the engagement controller 170 controls the first electromagnetic solenoid 52, so as to engage the Fr dog clutch 28. At this time, the Fr dog clutch 28 is rotating in synchronization. Namely, the movable sleeve 60 on which the meshing teeth 60a of the Fr dog clutch 28 are formed and the second rotating member 50 on which the meshing teeth 62 are formed are rotating in synchronization; therefore, shock that would occur when the meshing teeth 60a and the meshing teeth 62 mesh with each other is suppressed or reduced.

In the case of left turning, the rotational speed Nrr of the right rear wheel 14R on the turning outer wheel side becomes higher than the target rotational speed Nps* of the propeller shaft 20; therefore, rotation of the Fr dog clutch 28 can be synchronized by controlling the coupling torque Tcouple of the right control coupling 22R. Thus, the engagement controller 170 controls the coupling torque Tcouple of the right control coupling 22R that transmits power to the right rear wheel 14R on the turning outer wheel side, so as to synchronize rotation of the Fr dog clutch 28. Namely, the engagement controller 170 raises the rotational speed Nps of the propeller shaft 20 to the target rotational speed Nps* at which the Fr dog clutch 28 rotates in synchronization. The manner of calculating the coupling torque Tcouple is basically the same as that in the case of right turning as described above, and therefore, will not be described herein.

While the vehicle is traveling straight, each wheel rotates at the same rotational speed, and the target rotational speed Nps* of the propeller shaft 20 is equal to the rotational speed of each wheel (a value corresponding to the rotational speed of the propeller shaft 20). The coupling torque calculating unit 176 calculates the coupling torque Tcouple of the left and right control couplings 22L, 22R, during straight traveling of the vehicle. While the coupling torque Tcouple can be calculated based on Eq. (2), it may be set in advance within a range in which no slip occurs in the left and right control couplings 22L, 22R. The engagement controller 170 controls the coupling torque Tcouple of the left and right control couplings 22L, 22R to the value calculated by the coupling torque calculating unit 176, so as to synchronize rotation of the Fr dog clutch 28.

Figure 10:
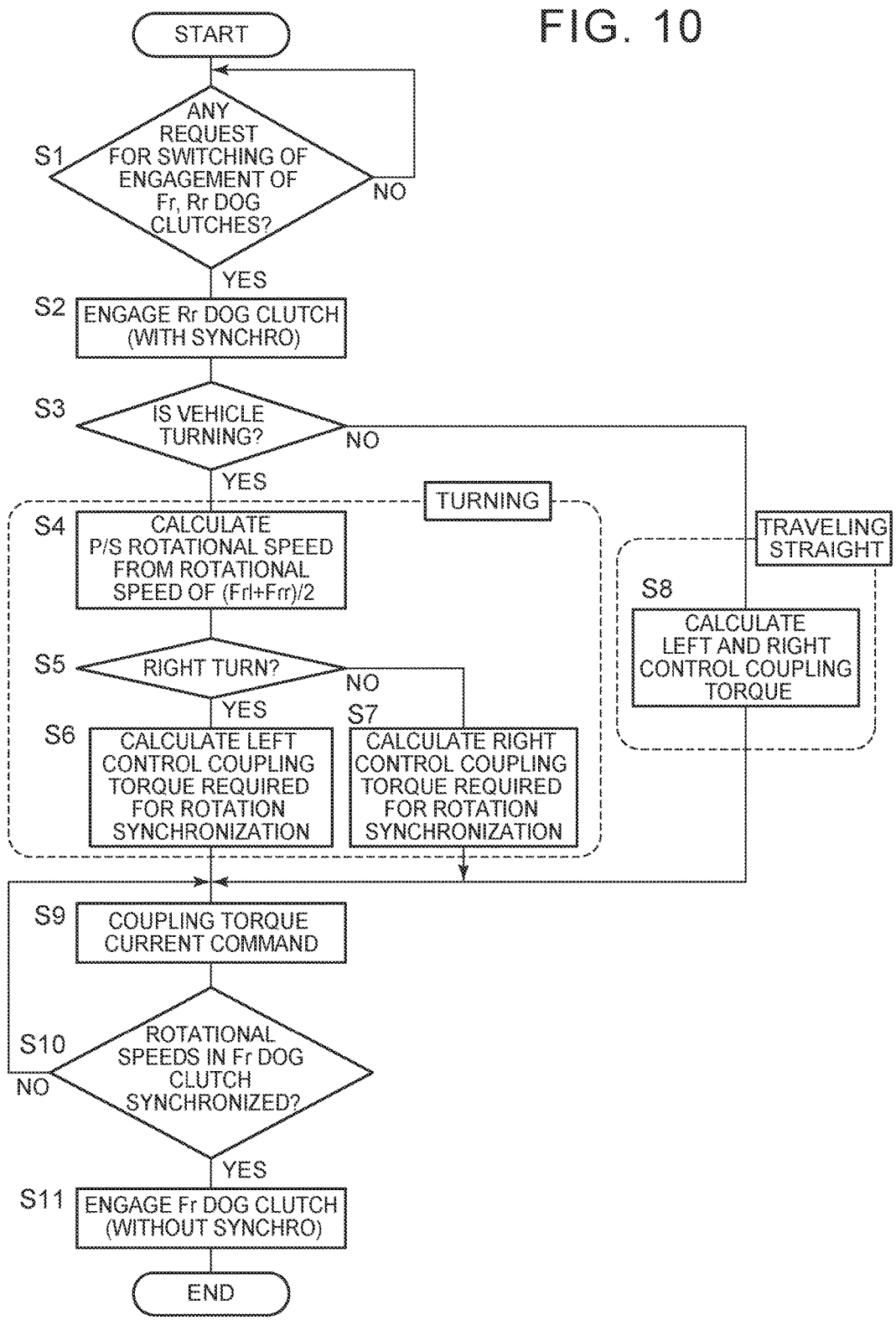
FIG. 10 is a flowchart illustrating a principal part of control operation of the electronic control unit of FIG. 7, more specifically, control operation performed when the vehicle is switched to a four-wheel-drive mode during traveling in a two-wheel-drive mode.

FIG. 10 is a flowchart useful for explaining a principal part of control operation of the electronic control unit 150, more specifically, control operation performed when the drive mode is switched to the four-wheel-drive mode during traveling in the two-wheel-drive mode. A control routine illustrated in this flowchart is repeatedly executed during traveling in the two-wheel-drive mode.

In step S1 corresponding to a control function of the switching request determining unit 172, it is determined whether a switching request for switching to the four-wheel-drive mode during traveling in the two-wheel-drive mode is generated. If the switching request is not generated, a negative decision (NO) is obtained in step S1, and step S1 is repeatedly executed until the switching request is generated. If the switching request is generated, an affirmative decision (YES) is obtained in step S1, and the control proceeds to step S2.

In step S2 corresponding to a control function of the engagement controller 170, the Rr dog clutch 40 is engaged, in response to the switching request thus generated. In step S3 corresponding to a control function of the vehicle turn determining unit 174, it is determined whether the vehicle is turning. If the vehicle is turning, an affirmative decision (YES) is obtained in step S3, and the control proceeds to step S4. In step S4 corresponding to a control function of the coupling torque calculating unit 176, the target rotational speed Nps* of the propeller shaft (P/S) 20 at which rotation of the Fr dog clutch 28 is synchronized is calculated, based on Eq. (1) as described above. In step S5 corresponding to a control function of the vehicle turn determining unit 174, it is determined whether the vehicle is turning right or left.

If it is determined in step S5 that the vehicle is turning right, the control proceeds to step S6. In step S6 corresponding to a control function of the coupling torque calculating unit 176, the coupling torque Tcouple of the left control coupling 22L required to synchronize rotation of the Fr dog clutch 28 is calculated, based on Eq. (2) as described above. Namely, the coupling torque Tcouple of the left control coupling 22L required to raise the rotational speed Nps of the propeller shaft 20 to the target rotational speed Nps* is calculated.

Returning to step S5, if it is determined that the vehicle is turning left, the control proceeds to step S7. In step S7 corresponding to a control function of the coupling torque calculating unit 176, the coupling torque Tcouple of the right control coupling 22R required to synchronize rotation of the Fr dog clutch 28 is calculated, based on Eq. (2) as described above. Namely, the coupling torque Tcouple of the right control coupling 22R required to raise the rotational speed Nps of the propeller shaft 20 to the target rotational speed Nps* is calculated.

Returning to step S3, when the vehicle is traveling straight, a negative decision (NO) is obtained in step S3, and the control proceeds to step S8. In step S8 corresponding to a control function of the coupling torque calculating unit 176, the coupling torque Tcouple of the left and right control couplings 22L, 22R required to synchronize rotation of the Fr dog clutch 28 is calculated.

In step S9 corresponding to a control function of the engagement controller 170, current command values of the left-rear-wheel solenoid 164 and the right-rear-wheel solenoid 166 are generated, so that the coupling torque Tcouple of one or both of the left and right control couplings 22L, 22R becomes equal to the value calculated in step S6, S7 or S8. In the case of right turning, the coupling torque calculated in step S6 is delivered from the left control coupling 22L. In the case of left turning, the coupling torque Tcouple calculated in step S7 is delivered from the right control coupling 22R. In the case of straight traveling, the coupling torque Tcouple calculated in step S8 is delivered from the left and right control couplings 22L, 22R.

In step S10 corresponding to a control function of the rotation synchronization determining unit 178, it is determined whether rotation of the Fr dog clutch 28 has been synchronized, based on whether a rotational speed difference between the target rotational speed Nps* and the rotational speed Nps of the propeller shaft 20 is smaller than the given value α. If the rotational speed difference is equal to or larger than the given value α, a negative decision (NO) is obtained in step S10, and the control returns to step S9, to continue to control the coupling torque Tcouple. If the rotational speed difference becomes smaller than the given value α, an affirmative decision (YES) is obtained in step S10, and the control proceeds to step S11. In step S11 corresponding to a control function of the engagement controller 170, the first electromagnetic solenoid 52 is controlled, so that the Fr dog clutch 28 is engaged.

As described above, according to this embodiment, when the drive mode is switched from the two-wheel-drive mode to the four-wheel-drive mode during turning of the vehicle, rotation of the Rr dog clutch 40 is synchronized by means of the synchro mechanism 116. Also, the coupling torque Tcouple of the control coupling 22 that transmits power to the rear wheel 14 that provides the outer wheel during turning is controlled, so that rotation of the Fr dog clutch 28 is synchronized. Thus, rotation of the Fr dog clutch 28, as well as the Rr dog clutch 40, is synchronized, so that shock at the time of engagement of the Fr dog clutch 28 can be suppressed or reduced, and shock can be suppressed even when the drive mode is switched from the two-wheel-drive mode to the four-wheel-drive mode during turning.

Next, another embodiment of the disclosure will be described. In the following description, the same reference numerals are assigned to portions or components common to the above embodiment and this embodiment, and these portions or components will not be further described.

Figure 11:
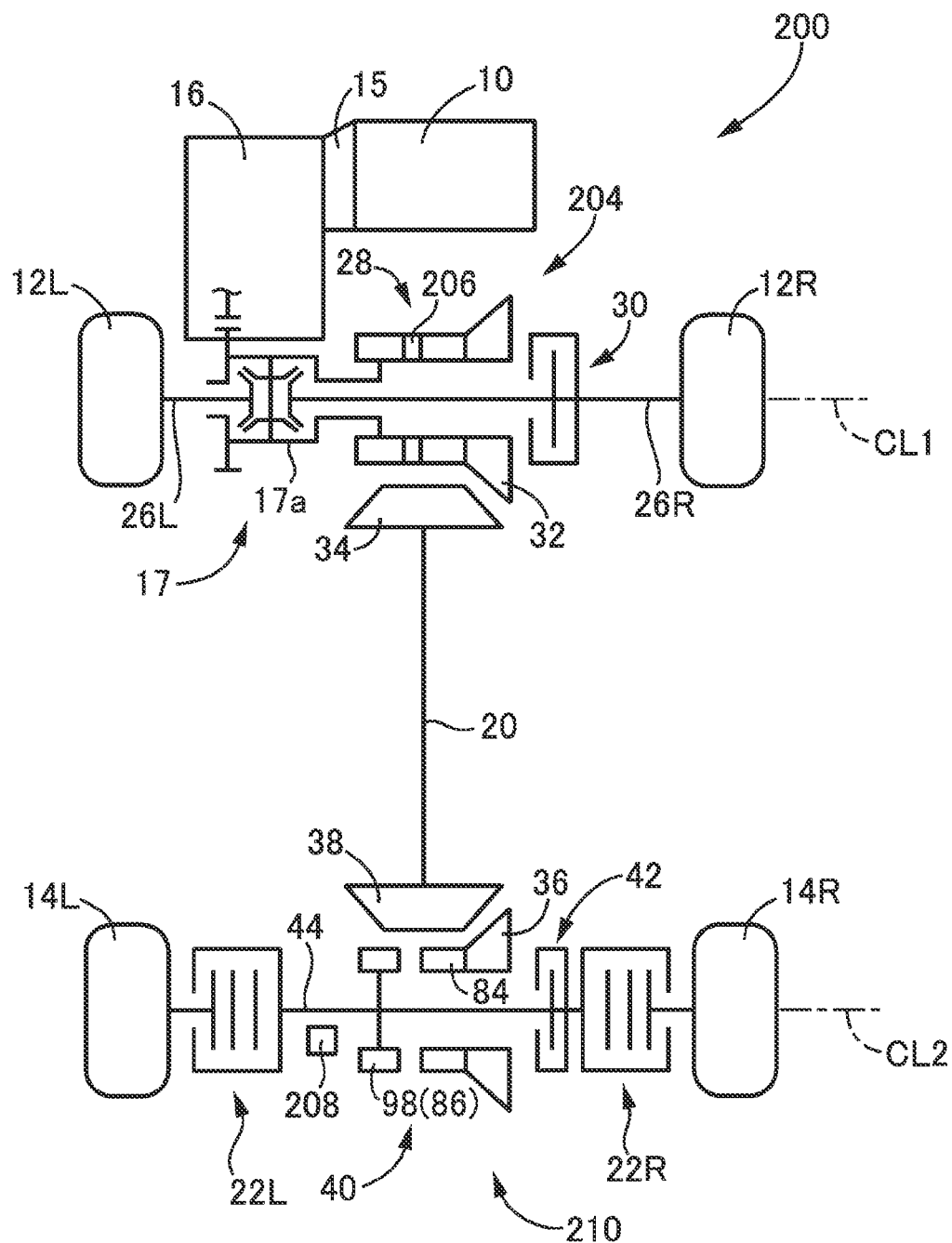
FIG. 11 is a skeleton diagram of a four-wheel drive system corresponding to another embodiment of the disclosure.

In the above embodiment, the synchro mechanism 116 for synchronizing rotation of the Rr dog clutch 40 is provided on the rear wheels 14 side. In a vehicular four-wheel drive system 200 (which will be simply called "four-wheel drive system 200") of this embodiment, a synchro mechanism 206 for synchronizing rotation of the Fr dog clutch 28 is provided on the front wheels 12 side. FIG. 11 is a skeleton diagram illustrating the structure of the four-wheel drive system 200 corresponding to this embodiment.

In the four-wheel drive system 200, the synchro mechanism 206 for synchronizing rotation of the Fr dog clutch 28 is provided in a front differential mechanism 204 (which will be simply called "front differential 204"). Accordingly, even if the Fr dog clutch 28 is not rotating in synchronization when the Fr dog clutch 28 is engaged, the synchro mechanism 206 is operated, so that shock that would occur during engagement is suppressed or reduced.

On the other hand, in a rear differential mechanism 210 (which will be simply called "rear differential 210"), no synchro mechanism is provided for synchronizing rotation of the Rr dog clutch 40. Accordingly, when the Rr dog clutch 40 is engaged, shock occurs during engagement if rotation of the Rr dog clutch 40 is not synchronized.

In this embodiment, a rotational speed sensor 208 for detecting the rotational speed Nr of the rear-wheel axle 44 is provided.

In the following, control of switching from the two-wheel-drive mode to the four-wheel-drive mode, in the four-wheel drive system 200 including the synchro mechanism 206 for synchronizing rotation of the Fr dog clutch 28, in the front differential 204, will be described. In this embodiment, too, an electronic control unit functionally includes the same controllers or units (see FIG. 7) as those of the above embodiment. Regarding each of the controllers or units, its portions common to the above embodiment and this embodiment will not be further described.

If it is determined by the switching request determining unit 172 that a request for switching to the four-wheel-drive mode is generated, the engagement controller 170 initially engages the Fr dog clutch 28 that is rotated in synchronization by means of the synchro mechanism 206. With the synchro mechanism 206 thus operated, shock that would occur at the time of engagement of the Fr dog clutch 28 is suppressed or reduced. With the Fe dog clutch 28 thus engaged, the propeller shaft 20 is rotated.

Once the Fr dog clutch 28 is engaged, the vehicle turn determining unit 173 determines whether the vehicle is turning. If it is determined by the vehicle turn determining unit 174 that the vehicle is turning, the coupling torque calculating unit 176 calculates the rotational speed Nps of the propeller shaft 20. The coupling torque calculating unit 176 calculates the rotational speed Nps of the propeller shaft 20, based on Eq. (1) of the above embodiment, for example. Also, in this embodiment, the propeller shaft 20 is rotated due to engagement of the Fr dog clutch 28; therefore, the rotational speed Nps can be directly detected by the propeller shaft speed sensor 162.

If the vehicle turn determining unit 174 determines that the vehicle is turning right, the coupling torque calculating unit 176 calculates the coupling torque Tcouple of the left control coupling 22L required to synchronize rotation of the Rr dog clutch 40, based on Eq. (2) of the above embodiment.

In this embodiment, since the propeller shaft 20 is rotating, a rotating body whose rotational speed is raised by the left control coupling 22L for synchronization of rotation of the Rr dog clutch 40 consists of the rear-wheel axle 44, fourth rotating member 86 fitted on the rear-wheel axle 44, and the movable sleeve 98. Accordingly, the moment of inertia Ia of the rotating body in Eq. (2) is the sum of the moments of inertia of the rear-wheel axle 44, fourth rotating member 86, and the movable sleeve 98.

In this embodiment, the target rotational speed N* of the rotating body is set based on the rotational speed Nr of the rear-wheel axle 44. With the propeller shaft 20 rotated, the third rotating member 84 is rotated via the drive pinion gear 38 and the Rr ring gear 36. When the rotational speed of the third rotating member 84 becomes substantially equal to the rotational speed of the movable sleeve 98 on which the meshing teeth 98a are formed, the Rr dog clutch 40 is rotated in synchronization, and shock that would occur during engagement is suppressed or reduced.

The target rotational speed N* of the rotating body of this embodiment is calculated from a rotational speed difference (Ndr−Nr) between the rotational speed Ndr of the third rotating member 84 on which the meshing teeth 100 that constitute the Rr dog clutch 40 are formed, and the rotational speed Nr of the rear-wheel axle 44 that rotates as a unit with the fourth rotating member 86 and the movable sleeve 98. The rotational speed Ndr of the third rotating member 84 is calculated by multiplying the rotational speed Nps of the propeller shaft 20, by the gear ratio between the drive pinion gear 38 and the Rr ring gear 36. Since the rotational speed Nr of the rear-wheel axle 44 is equal to zero or substantially equal to zero, immediately after engagement of the Fr dog clutch 28, the target rotational speed N* is substantially equal to the rotational speed Ndr. The engagement controller 170 synchronizes rotation of the Rr dog clutch 40, by controlling the coupling torque Tcouple of the left control coupling 22L, to the value calculated according to Eq. (2). In this embodiment, too, the coupling torque Tcouple of the left control coupling 22L that transmits power to the front wheel 12L on the turning outer wheel side is controlled.

If it is determined that the vehicle is turning left, the coupling torque calculating unit 176 calculates the coupling torque Tcouple of the right control coupling 22R, and the engagement controller 170 synchronizes rotation of the Rr dog clutch 40, by controlling the coupling torque Tcouple of the right control coupling 22R to the calculated value. The method of calculating the coupling torque Tcouple of the right control coupling 22R is basically the same as that in the case of right turning as described above, and therefore, will not be further described.

If it is determined that the vehicle is traveling straight, the coupling torque calculating unit 176 calculates the coupling torque Tcouple of the left and right control couplings 22L, 22R, based on Eq. (2) for example. The engagement controller 170 controls the coupling torque Tcouple of the left and right control couplings 22 to the calculated value.

The rotation synchronization determining unit 178 determines whether rotation of the Rr dog clutch 40 has been synchronized. The rotation synchronization determining unit 178 determines that rotation of the Rr dog clutch 40 has been synchronized, when the rotational speed difference (Ndr−Nr) between the target rotational speed N* (rotational speed Ndr), and the rotational speed Nr of the rear-wheel axle 44 detected by the rotational speed sensor 208, becomes smaller than a preset given value β. The given value β is set in advance to a value small enough to determine that rotation of the Rr dog clutch 40 has been synchronized.

If it is determined by the rotation synchronization determining unit 178 that rotation of the Rr dog clutch 40 has been synchronized, the engagement controller 170 engages the Rr dog clutch 40. At this time, the movable sleeve 98 on which the meshing teeth 98a that constitute the Rr dog clutch 40 are formed, and the third rotating member 84 on which the meshing teeth 100 are formed, rotate in synchronization with each other; therefore, shock that would occur upon meshing engagement is suppressed or reduced.

Figure 12:
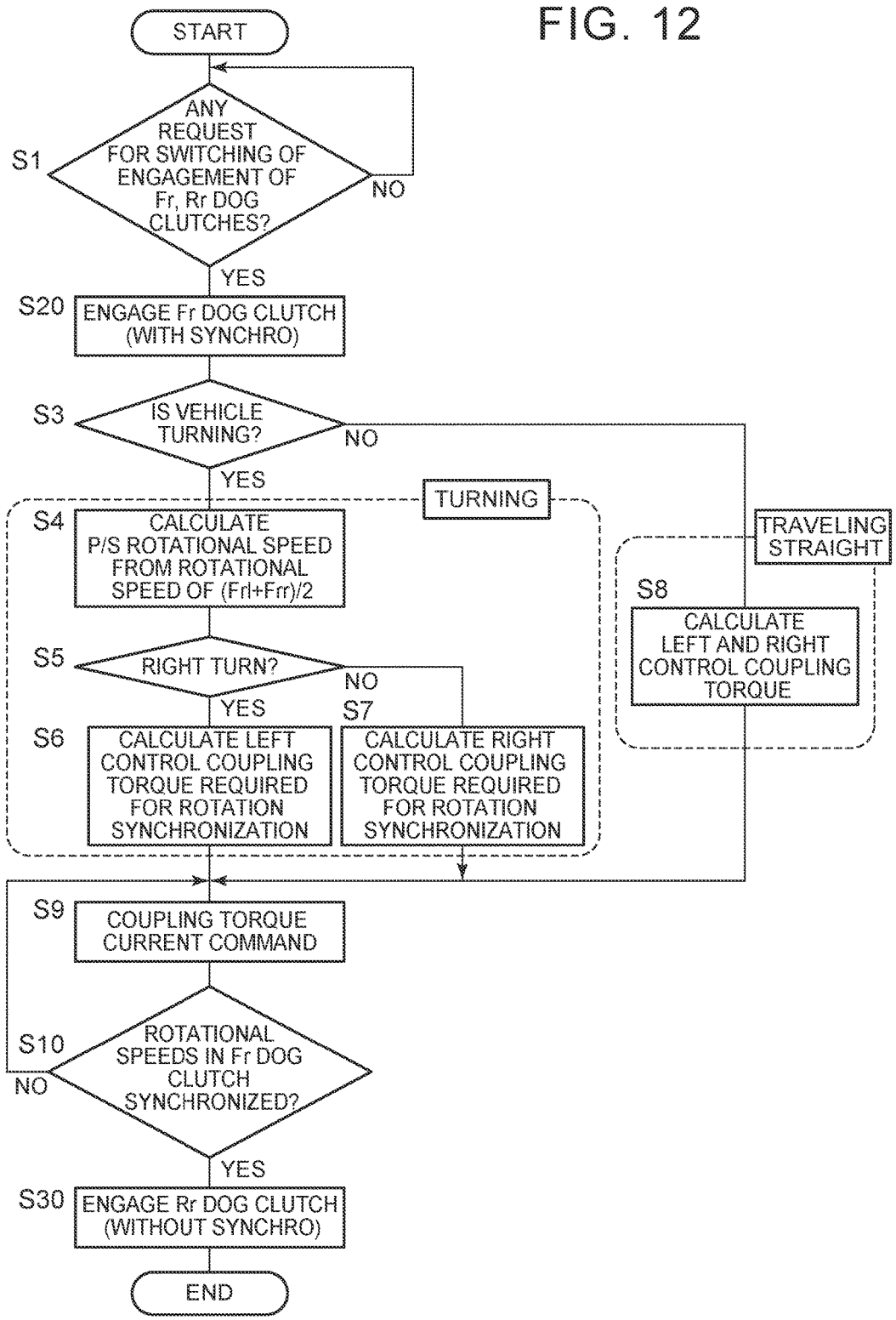
FIG. 12 is a flowchart illustrating a principal part of control operation of an electronic control unit that controls the four-wheel drive system of FIG. 11, namely, control operation performed when the vehicle is switched to the four-wheel-drive mode during traveling in the two-wheel-drive mode.

FIG. 12 is a flowchart useful for explaining a principal part of control operation of the electronic control unit of this embodiment, namely, control operation performed when the drive mode is switched to the four-wheel-drive mode during traveling in the two-wheel-drive mode.

In step S1 corresponding to a control function of the switching request determining unit 172, it is determined whether a request for switching the drive mode from the two-wheel-drive mode to the four-wheel-drive mode has been generated. In step S20 corresponding to a control function of the engagement controller 170, the Fr dog clutch 28 is engaged. In step S3 corresponding to a control function of the vehicle turn determining unit 174, it is determined whether the vehicle is in the middle of turning. If it is determined that the vehicle is turning, the rotational speed Nps of the propeller shaft 20 is obtained according to Eq. (1) as described above, or by use of the propeller shaft speed sensor 162, in step S4 corresponding to a control function of the coupling torque calculating unit 176.

In step S5 corresponding to a control function of the vehicle turn determining unit 174, it is determined whether the vehicle is turning right, or turning left. If it is determined that the vehicle is turning right, the control proceeds to step S6 corresponding to a control function of the coupling torque calculating unit 176, and the coupling torque Tcouple of the left control coupling 22L required to synchronize rotation of the Rr dog clutch 40 is calculated based on Eq. (2).

If it is determined in step S5 that the vehicle is turning left, the control proceeds to step S7 corresponding to a control function of the coupling torque calculating unit 176, and the coupling torque Tcouple of the right control coupling 22R required to synchronize rotation of the Rr dog clutch 40 is calculated based on Eq. (2). If it is determined in step S3 that the vehicle is traveling straight, the coupling torque Tcouple of the left and right control couplings 22L, 22R is calculated, in step S8 corresponding to a control function of the coupling torque calculating unit 176.

In step S9 corresponding to a control function of the engagement controller 170, current command values of the left-rear-wheel solenoid 164 and the right-rear-wheel solenoid 166 are generated, so that the coupling torque Tcouple of one or both of the left and right control couplings 22L, 22R becomes equal to the value calculated in step S6, S7, or S8.

In step S10 corresponding to a control function of the rotation synchronization determining unit 178, it is determined whether the propeller shaft 20 and the Rr dog clutch 40 rotate in synchronization with each other, based on whether the rotational speed difference (Ndr−Nr) between the rotational speed Ndr of the third rotating member 84 on which the meshing teeth 100 are formed, and the rotational speed Nr of the rear-wheel axle 44 detected by the rotational speed sensor 208, becomes smaller than the given value β. If the rotational speed difference is equal to or larger than the given value β, a negative decision (NO) is obtained in step S10, and the control returns to step S9, and continues to control the coupling torque Tcouple. If the rotational speed difference becomes smaller than β, an affirmative decision (YES) is obtained in step S10, and the control proceeds to step S30. In step S30 corresponding to a control function of the engagement controller 170, the second electromagnetic solenoid 124 is controlled, so that the Rr dog clutch 40 is engaged.

Even in the case where the synchro mechanism 206 for synchronizing rotation of the Fr dog clutch 28 is provided on the Fr dog clutch 28 side, it is possible to synchronize rotation of the Rr dog clutch 40 which is not synchronized by any synchro mechanism, by suitably controlling the coupling torque Tcouple of the control coupling 22. Accordingly, shock that would occur during engagement of the Rr dog clutch 40 can be suppressed or reduced.

Figure 13:
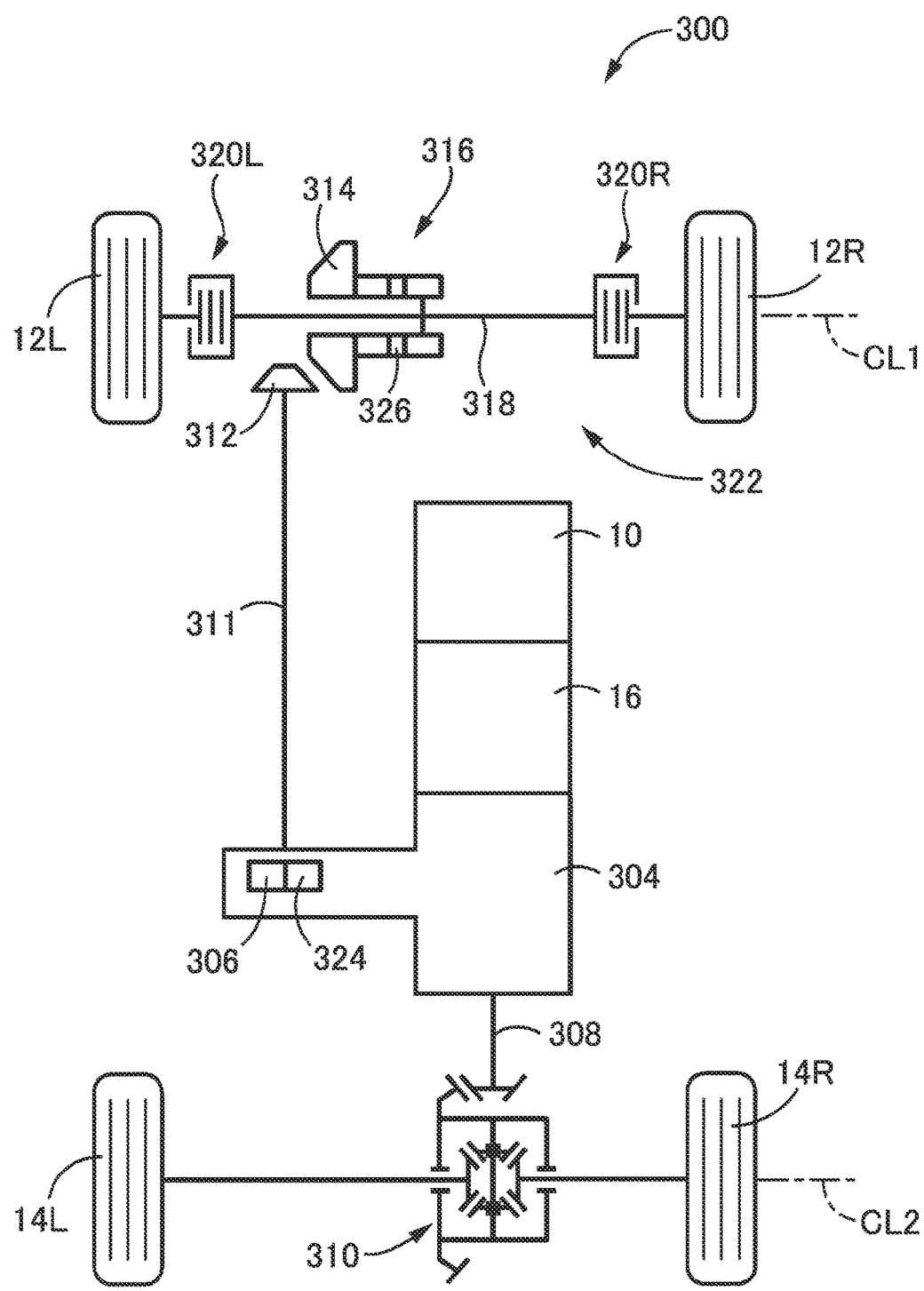
FIG. 13 is a skeleton diagram of a four-wheel drive system corresponding to a further embodiment of the disclosure.

FIG. 13 is a skeleton diagram of a vehicular four-wheel drive system 300 (which will be simply called "four-wheel drive system 300") corresponding to a further embodiment of the disclosure. As shown in FIG. 13, the four-wheel drive system 300 includes a pair of control couplings 320L, 320R that distribute drive power to left and right front wheels 12 that function as secondary drive wheels. The four-wheel drive system 300 of this embodiment is an FR-vehicle-based, four-wheel drive system that uses the engine 10 as a drive source, and transmits drive power delivered from the engine 10 to the rear wheels 14 as primary drive wheels, and the front wheels 12L, 12R as secondary drive wheels.

In the four-wheel drive system 300, a transfer case 304 has a function of distributing drive power delivered from the engine 10, to the rear wheels 14 that function as primary drive wheels, and the front wheels 12 that function as secondary drive wheels. The transfer case 304 includes a first dog clutch 306, and transmits drive power transmitted from the engine 10 to the left and right rear wheels 14, via a first propeller shaft 308, a rear differential mechanism 310 (which will be simply called "rear differential 310"), etc., during two-wheel driving and four-wheel driving. During four-wheel driving, the transfer case 304 also transmits a part of the drive power transmitted from the engine 10, to the left and right front wheels 12, via a second propeller shaft 311, drive pinion gear 312, Fr ring gear 314, second dog clutch 316, front-wheel axle 318, and the left and right control couplings 320L, 320R. The first dog clutch 306 corresponds to the first meshing clutch of the disclosure, and the second propeller shaft 311 corresponds to the propeller shaft of the disclosure, while the second dog clutch 316 corresponds to the second meshing clutch of the disclosure.

For example, when the first dog clutch 306 is disengaged, the transfer case 304 and the second propeller shaft 311 are disconnected from each other. At this time, no drive power is transmitted to the front wheels 12, and the vehicle is placed in a two-wheel drive state in which drive power is transmitted from the engine 10 to the rear wheels 14. Since the second dog clutch 316, as well as the first dog clutch 306, is disengaged during two-wheel driving, dragging of the second propeller shaft 311 is curbed or prevented, and the fuel efficiency is improved. On the other hand, when the first dog clutch 306 and the second dog clutch 316 are engaged, the vehicle is placed in a four-wheel drive state in which drive power is transmitted to the front wheels 12 via the second propeller shaft 311, etc. Thus, the first dog clutch 306 and the second dog clutch 316 are selectively switched between the engaged and disengaged states, so that the vehicle is switched between the two-wheel-drive mode and the four-wheel-drive mode.

The front differential mechanism 322 (which will be simply called "front differential 322") of this embodiment includes the drive pinion gear 312 coupled to an end portion of the second propeller shaft 311, Fr ring gear 314 that meshes with the drive pinion gear 312 and rotates about the axis CL1, second dog clutch 316 that selectively connects and disconnects the Fr ring gear 314 to and from the front-wheel axle 318, and the pair of control couplings 320L, 320R that distribute drive power to the left and right front wheels 12. The front differential 322 corresponds to the differential mechanism of the disclosure.

The four-wheel drive system 300 includes either one of a synchro mechanism 324 that synchronizes rotation of the first dog clutch 306, and a synchro mechanism 326 that synchronizes rotation of the second dog clutch 316.

In the four-wheel drive system 300 in which the pair of left and right control couplings 320L, 320R are provided on the front wheels 12 side as described above, too, the coupling torque Tcouple of the control couplings 320L, 320R is controlled, so that rotation of a dog clutch that is not rotated in synchronization by a synchro mechanism is synchronized, so that shock that would occur during engagement can be suppressed or reduced.

In the case where the synchro mechanism 324 that synchronizes rotation of the first dog clutch 306 is provided, for example, if a request for switching from the two-wheel-drive mode to the four-wheel-drive mode is generated during traveling, the first dog clutch 306 is initially engaged. Then, the coupling torque Tcouple of one or both of the control couplings 320L, 320R is controlled according to turning of the vehicle, so that rotation of the second dog clutch 316 is synchronized. When the vehicle turns right, for example, the coupling torque Tcouple of the left control coupling 320L required to synchronize rotation of the second dog clutch 316 is calculated, and the coupling torque Tcouple of the left control coupling 320L is controlled to the calculated value. When the vehicle turns left, the coupling torque Tcouple of the right control coupling 320R required to synchronize rotation of the second dog clutch 316 is calculated, and the coupling torque Tcouple of the right control coupling 320R is controlled to the calculated value. Thus, the coupling torque Tcouple of one of the control coupling 320L, 320R which transmits torque to the front wheel 12 that provides the outer wheel during turning is controlled to the value required to synchronize rotation of the second dog clutch 316, so that rotation of the second dog clutch 316 is synchronized, and shock that would occur when the second dog clutch 316 is engaged is suppressed or reduced. The method of calculating the coupling torque Tcouple is basically the same as that of the above embodiments, and therefore, will not be described herein.

In the case where the synchro mechanism 326 that synchronizes rotation of the second dog clutch 316 is provided, if a request for switching from the two-wheel-drive mode to the four-wheel-drive mode is generated during traveling, the second dog clutch 316 is initially engaged. Then, the coupling torque Tcouple of one or both of the control couplings 320L, 320R is controlled according to turning of the vehicle, so that rotation of the first dog clutch 306 is synchronized. When the vehicle turns right, for example, the coupling torque Tcouple of the left control coupling 320L required to synchronize rotation of the first dog clutch 306 is calculated, and the coupling torque of the left control coupling 320L is controlled to the calculated value. When the vehicle turns left, the coupling torque Tcouple of the right control coupling 320R required to synchronize rotation of the first dog clutch 306 is calculated, and the coupling torque Tcouple of the right control coupling 320R is controlled to the calculated value. Thus, the coupling torque Tcouple of one of the control couplings 320L, 320R which transmits torque to the front wheel 12 that provides the outer wheel during turning is controlled to the value required to synchronize rotation of the first dog clutch 306, so that rotation of the first dog clutch 306 is synchronized, and shock that would occur when the first dog clutch 306 is engaged is suppressed or reduced. The method of calculating the coupling torque Tcouple is basically the same as that of the above embodiment, and therefore, will not be described.

As described above, even in the case where the control couplings 320L, 320R are provided on the front wheels 12 side, and either one of the synchro mechanism 324 that synchronizes rotation of the first dog clutch 306, and the synchro mechanism 326 that synchronizes rotation of the second dog clutch 316, is provided, the dog clutch that is rotated in synchronization by means of the synchro mechanism is initially engaged, and then, rotation of the dog clutch that is not synchronized by any synchro mechanism is synchronized by controlling the coupling torque Tcouple of the control coupling 320L, 320R, so that shock that would occur at the time of engagement can be suppressed or reduced.

While some embodiments of the disclosure have been described in detail based on the drawings, the disclosure may be applied in other forms.

In the embodiments as described above, when the drive mode is switched from the two-wheel-drive mode to the four-wheel-drive mode during traveling, the dog clutch of which rotation is synchronized by the synchro mechanism is engaged, and then, turning of the vehicle is determined. However, turning of the vehicle is not necessarily determined after engagement of the dog clutch of which rotation is synchronized by the synchro mechanism, but may be determined at the time when a request for switching to the four-wheel-drive mode is generated, or at the time when the dog clutch starts being engaged, or during an engagement transient period of the dog clutch.

In the embodiments as described above, switching from the second-wheel-drive mode to the four-wheel-drive mode is determined, based on the preset drive region map. However, the switching may be determined based on driver's operation to turn on a switch for switching to the four-wheel-drive mode.

It is to be understood that the above-described embodiments are mere examples, and that the disclosure may be embodied with various changes, modifications, and/or improvements, based on the knowledge of those skilled in the art.

One aspect of the disclosure may be defined as follows. A control device for a four-wheel drive system of a vehicle, the four-wheel drive system including a transfer case configured to distribute a part of drive power generated from a drive source to left and right secondary drive wheels, a differential mechanism coupled to the left and right secondary drive wheels, a propeller shaft that transmits power delivered from the transfer case, to the differential mechanism, a first meshing clutch provided in the transfer case, the first meshing clutch being configured to selectively permit and inhibit power transmission between the drive source and the propeller shaft, and a second meshing clutch configured to selectively permit and inhibit power transmission between the propeller shaft and the differential mechanism, the differential mechanism including a pair of control couplings configured to adjust transmission torque transmitted to the left and right secondary drive wheels, one of the first meshing clutch and the second meshing clutch including a synchro mechanism, the control device includes an electronic control unit configured to, when the four-wheel drive system is switched from a two-wheel drive state in which the first meshing clutch and the second meshing clutch are released to a four-wheel drive state in which the first meshing clutch and the second meshing clutch are engaged during turning, synchronize rotation of the above-indicated one of the first meshing clutch and the second meshing clutch including the synchro mechanism, by means of the synchro mechanism, and synchronize rotation of the other of the first meshing clutch and the second meshing clutch, by controlling coupling torque of one of the pair of control couplings which transmits power to one of the secondary drive wheels which provides an outer wheel.

What is claimed is:

1. A control device for a four-wheel drive system of a vehicle,
the four-wheel drive system including
a transfer case configured to distribute a part of drive power generated from a drive source to left and right secondary drive wheels,
a differential mechanism coupled to the left and right secondary drive wheels,
a propeller shaft that transmits power delivered from the transfer case, to the differential mechanism,
a first meshing clutch provided in the transfer case, the first meshing clutch being configured to selectively permit and inhibit power transmission between the drive source and the propeller shaft, and
a second meshing clutch configured to selectively permit and inhibit power transmission between the propeller shaft and the differential mechanism,
the differential mechanism including a pair of control couplings configured to adjust transmission torque transmitted to the left and right secondary drive wheels,
one of the first meshing clutch and the second meshing clutch including a synchro mechanism,
the control device comprising
an electronic control unit configured to, when the four-wheel drive system is switched from a two-wheel drive state in which the first meshing clutch and the second meshing clutch are released to a four-wheel drive state in which the first meshing clutch and the second meshing clutch are engaged during turning,
synchronize rotation of the one of the first meshing clutch and the second meshing clutch including the synchro mechanism, by means of the synchro mechanism, and
synchronize rotation of the other of the first meshing clutch and the second meshing clutch, by controlling coupling torque of one of the pair of control couplings which transmits power to one of the left and right secondary drive wheels which provides an outer wheel.

2. The control device according to claim 1, wherein
the synchro mechanism is configured to synchronize rotation of the second meshing clutch, and
the electronic control unit is configured to synchronize rotation of the first meshing clutch by controlling the coupling torque of the one of the control couplings after the second meshing clutch is engaged.

3. The control device according to claim 1, wherein
the synchro mechanism is configured to synchronize rotation of the first meshing clutch, and
the electronic control unit is configured to synchronize rotation of the second meshing clutch by controlling the coupling torque of the one of the control couplings after the first meshing clutch is engaged.

4. The control device according to claim 1, wherein
the electronic control unit is configured to engage the other of the first meshing clutch and the second meshing clutch, after rotation of the other of the first meshing clutch and the second meshing clutch is synchronized.

5. The control device according to claim 1, wherein
the electronic control unit is configured to calculate the coupling torque, by multiplying a moment of inertia of a rotating body whose rotational speed is raised by the one of the control couplings, by an angular acceleration calculated from a target rotational speed of the rotating body at which rotation of the other of the first meshing clutch and the second meshing clutch is synchronized, and a preset target engagement time of the one of the control coupling.

* * * * *